US012726880B2

(12) United States Patent
Xu et al.

(10) Patent No.: US 12,726,880 B2
(45) Date of Patent: Sep. 1, 2026

(54) DATA TRANSMISSION METHOD AND APPARATUS

(71) Applicant: HUAWEI TECHNOLOGIES CO., LTD., Shenzhen (CN)

(72) Inventors: Shengfeng Xu, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/422,461

(22) Filed: Jan. 25, 2024

(65) Prior Publication Data

US 2024/0172084 A1 May 23, 2024

Related U.S. Application Data

(63) Continuation of application No. PCT/CN2022/111546, filed on Aug. 10, 2022.

(30) Foreign Application Priority Data

Aug. 11, 2021 (CN) ......................... 202110919122.0

(51) Int. Cl.
*H04W 40/22* (2009.01)

(52) U.S. Cl.
CPC .................................. *H04W 40/22* (2013.01)

(58) Field of Classification Search
CPC .................................................... H04W 40/22
USPC ........................................................ 370/328
See application file for complete search history.

(56) References Cited

U.S. PATENT DOCUMENTS 10,021,613 B1 * 7/2018 Oroskar ............... H04B 7/2606
2018/0227282 A1 * 8/2018 Lee ....................... H04W 12/10
2021/0153063 A1 * 5/2021 Zhang .................. H04W 88/04
2024/0040426 A1 * 2/2024 Zhang .............. H04W 28/0263

FOREIGN PATENT DOCUMENTS

CN 115707036 A 2/2023
EP 4373204 A1 5/2024

OTHER PUBLICATIONS

3rd Generation Partnership Project; Technical Specification Group Services and System Aspects;Proximity based Services (ProSe) in the 5G System (5GS)(Release 17),3GPP TS 23.304 V1.0.0 (Jun. 2021), total:90pages.
Office Action issued in CN202280010973.6 dated Oct. 11, 2025.
Huawei et al: “UE Aggregation.” 3GPP TSG RAN Meeting #92-e Electronic Meeting, Jun. 14-18, 2021 RWS-210451. total 3 pages.

(Continued)

*Primary Examiner* — Peter G Solinsky
(74) *Attorney, Agent, or Firm* — HAUPTMAN HAM, LLP

(57) ABSTRACT

A data transmission method includes determining, by a terminal device, to use a multi-path transmission mode for transmission of a first data flow. The multi-path transmission mode is through at least two paths. The data transmission method further includes performing, by the terminal device, transmission of the first data flow through at least two paths of a second path set. The second path set includes a direct network communication path on which the terminal device is configured to access a network and an indirect network communication path on which the terminal device is configured to access the network through a relay terminal device.

20 Claims, 6 Drawing Sheets

700

S710: A terminal device determines to use a multi-path transmission mode for transmission of a first data flow, where the multi-path transmission mode is a mode of transmission through at least two paths S720: The terminal device performs transmission of the first data flow through at least two paths that are in a second path set, where the second path set includes a direct network communication path on which the terminal device accesses a network and an indirect network communication path on which the terminal device accesses the network through a relay terminal device

(56) References Cited

OTHER PUBLICATIONS

Huawei et al: "NR uplink boosting." 3GPP TSG RAN Rel-18 workshop Electronic Meeting, Jun. 28-Jul. 2, 2021 RWS-210436. total 9 pages.
Extended European Search Report issued in corresponding European Application No. 22855481.2, dated Sep. 10, 2024, pp. 1-9.

* cited by examiner

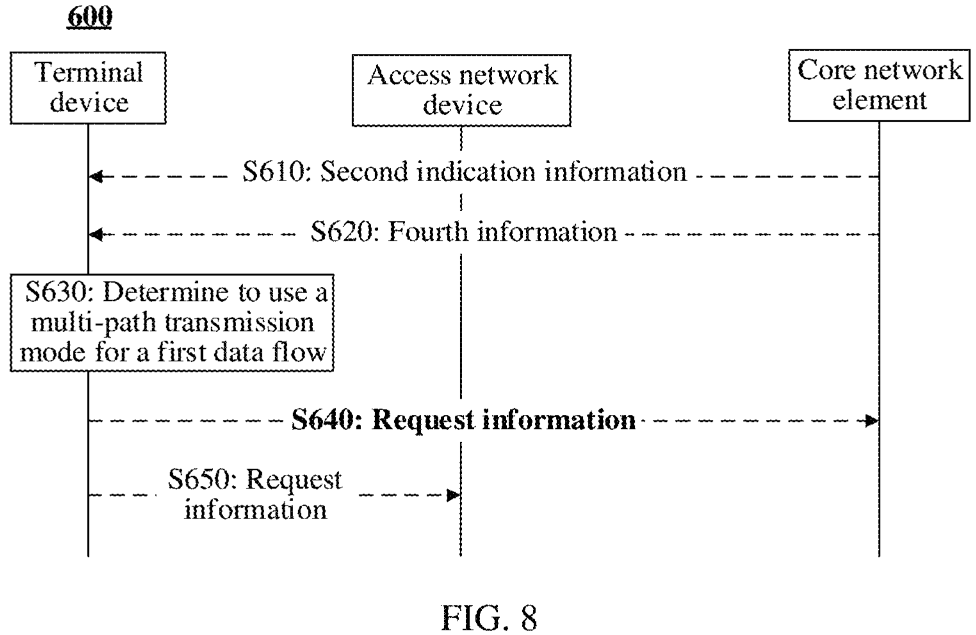

S710: A terminal device determines to use a multi-path transmission mode for transmission of a first data flow, where the multi-path transmission mode is a mode of transmission through at least two paths S720: The terminal device performs transmission of the first data flow through at least two paths that are in a second path set, where the second path set includes a direct network communication path on which the terminal device accesses a network and an indirect network communication path on which the terminal device accesses the network through a relay terminal device

FIG. 9

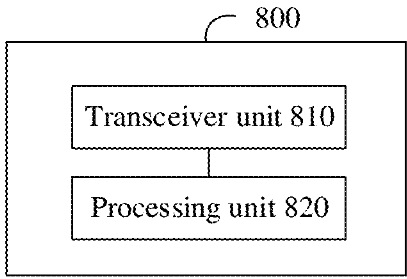

FIG. 10

DATA TRANSMISSION METHOD AND APPARATUS

CROSS-REFERENCE TO RELATED APPLICATIONS

This application is a continuation of International Application No. PCT/CN2022/111546, filed on Aug. 10, 2022, which claims priority to Chinese Patent Application No. 202110919122.0, filed on Aug. 11, 2021, the disclosures of the aforementioned applications are hereby incorporated by reference in their entireties.

TECHNICAL FIELD

This application relates to the communications field, and more specifically, to a data transmission method and an apparatus.

BACKGROUND

With rapid development of mobile communication, universal use of new service types, for example, data services such as video chat and virtual reality (VR)/augmented reality (AR), increases a bandwidth requirement of a user. Device-to-device (D2D) communication allows direct communication between user equipments (UE), and the D2D communication includes one-to-many communication and one-to-one communication. The one-to-many communication corresponds to multicast and broadcast communication, and the one-to-one communication corresponds to unicast communication. In the one-to-one communication, if sending UE and receiving UE are within a short distance range, the sending UE and the receiving UE may directly communicate with each other after mutual discovery, and the sending UE and the receiving UE communicate with each other through a PC5 (prose communication 5) interface.

In network architectures of some approaches, the UE may be directly connected to a radio access network (RAN) for communication, or communication between the UE and the RAN may be implemented with assistance of relay UE. For example, when the UE is within coverage of the RAN, or when quality of communication between the UE and the RAN is good, the UE communicates with the RAN through a direct path. When the UE is outside coverage of the RAN, or quality of communication between the UE and the RAN is poor, that is, when the UE cannot be directly connected to the RAN, the communication between the UE and the RAN may be implemented with assistance of the relay UE (in this scenario, the UE is referred to as remote UE, and D2D communication is performed between the remote UE and the relay UE). That is, the UE performs switching from the direct path to an indirect path to communicate with the RAN. It can be learned that the UE communicates with the RAN through one path before and after the communication path is switched. However, when the UE communicates with the RAN through only one path, communication quality is poor, or a data transmission rate is low. Therefore, how to improve reliability or a rate of data transmission is a problem to be urgently resolved currently.

SUMMARY

One or more embodiments of the present application provide a data transmission method and an apparatus, so that a terminal device can communicate with a network device through a plurality of paths, thereby improving reliability or a rate of data transmission.

According to a first aspect, a data transmission method is provided. The method may be performed by an access network device, or may be performed by a component (such as a chip or a chip system) configured in the access network device. This is not limited in this application. The method includes: The access network device determines a plurality of paths that are for transmission of a first quality of service QoS flow of a terminal device, where the plurality of paths include at least two paths that are in a first path set, the first path set includes N indirect paths, and a direct path between the access network device and the terminal device, the N indirect paths include indirect paths that are between the access network device and the terminal device and that pass through N relay terminal devices, and N is an integer greater than or equal to 1. The access network device performs transmission of the first QoS flow through the plurality of paths.

In some embodiments, the access network device determines the at least two paths for transmission of data, so that when communication quality of one of the at least two paths is poor, reliability or a rate of data transmission can be improved. Specifically, when the access network device performs transmission of same packets of the first QoS flow through the at least two paths, reliability of the packet transmission can be improved; or when the access network device splits a packet of the first QoS flow, and performs transmission of different packets through the at least two paths, a transmission rate of the first QoS flow can be increased.

That the access network device determines the at least two paths includes: The access network device establishes the at least two paths that are for transmission of the first QoS flow of the terminal device (when there is only one path between the access network device and the terminal device), or the access network device selects the plurality of paths that are for transmission of the first QoS flow (when there are already a plurality of paths between the access network device and the terminal device).

With reference to the first aspect, in some possible implementations, the access network device receives first indication information from a core network element, where the first indication information indicates to use a multi-path transmission mode for the first QoS flow. The access network device determines, based on the first indication information, the plurality of paths that are for transmission of the first QoS flow of the terminal device.

With reference to the first aspect, in some possible implementations, the first indication information further includes a specific form of the multi-path transmission mode, namely, duplication transmission or split transmission.

For example, if the specific form of the multi-path transmission mode is duplication transmission, in an example of a downlink QoS flow, the access network device duplicates a packet of the first QoS flow, and performs transmission of same packets to the terminal device through the plurality of paths, and then the terminal device deduplicates the packets. If the specific form of the multi-path transmission mode is split transmission, in an example of a downlink QoS flow, the access network device performs transmission of different packets of the first QoS flow to the terminal device through different paths.

With reference to the first aspect, in some possible implementations, before the access network device determines the plurality of paths that are for transmission of the first QoS flow of the terminal device, the access network device determines to use the multi-path transmission mode for the first QoS flow.

With reference to the first aspect, in some possible implementations, the multi-path transmission mode includes a multi-path transmission mode that is performed through a relay terminal device.

In some embodiments, the access network device may determine, based on a preference that is of the multi-path transmission mode and that is indicated by the core network element, the plurality of paths that are for transmission of the first QoS flow.

With reference to the first aspect, in some possible implementations, the access network device determines, based on authorization information, to use the multi-path transmission mode for the first QoS flow, where the authorization information indicates that the terminal device is authorized to serve as a remote terminal device or is authorized to use the multi-path transmission mode.

In some embodiments, if the authorization information indicates that the terminal device is authorized to serve as the remote terminal device or is authorized to use the multi-path transmission mode, the access network device determines to use the multi-path transmission mode for the first QoS flow. If the authorization information indicates that the terminal device is not authorized to serve as the remote terminal device or is not authorized to use the multi-path transmission mode, the access network device determines that the multi-path transmission mode cannot be used for the first QoS flow.

With reference to the first aspect, in some possible implementations, the access network device receives request information from the terminal device, where the request information requests to use the multi-path transmission mode for transmission of the first QoS flow. The access network device determines, based on the request information, to use the multi-path transmission mode for the first QoS flow. Alternatively, the access network device determines, based on the request information and authorization information, to use the multi-path transmission mode for the first QoS flow, where the authorization information indicates that the terminal device is authorized to serve as a remote terminal device or is authorized to use the multi-path transmission mode.

With reference to the first aspect, in some possible implementations, when a QoS parameter of the first QoS flow is not fulfilled, the access network device determines to use the multi-path transmission mode for the first QoS flow.

With reference to the first aspect, in some possible implementations, when the QoS parameter of the first QoS flow of which transmission is performed through the plurality of paths is not fulfilled, the access network device sends first information to the core network element, where the first information indicates that the QoS parameter of the first QoS flow is not fulfilled, or the first information indicates that the QoS parameter of the first QoS flow is not fulfilled when the multi-path transmission mode is used for the first QoS flow.

In some embodiments, when the QoS parameter of the first QoS flow of which transmission is performed through the plurality of paths is not fulfilled, the access network device sends the first information to the core network element. After receiving the first information, the core network element does not trigger the access network device to establish the plurality of paths for transmission of the first QoS flow.

With reference to the first aspect, in some possible implementations, the access network device sends second information to the terminal device, where the second information is for triggering the terminal device to report information about a relay terminal device. The access network device receives information about at least one relay terminal device from the terminal device. The access network device establishes, based on the information about the at least one relay terminal device, the indirect path that is in the plurality of paths.

With reference to the first aspect, in some possible implementations, the access network device sends third information to the at least one relay terminal device, where the third information is for triggering the at least one relay terminal device to participate in relay discovery.

In some embodiments, the access network device can send the second information to the terminal device, and send the third information to the relay terminal device, so that the relay terminal device participates in relay discovery. This avoids a case in which the terminal device cannot report information or the relay terminal device does not participate in relay discovery, thereby effectively completing establishment of the plurality of paths.

With reference to the first aspect, in some possible implementations, the access network device establishes a dedicated data radio bearer for the first QoS flow, and the access network device performs transmission of the first QoS flow to the terminal device on the data radio bearer through the plurality of paths.

With reference to the first aspect, in some possible implementations, the access network device receives max path number information corresponding to the multi-path transmission mode, and the access network device determines a quantity of the plurality of paths based on the max path number information.

In some embodiments, the access network device may determine, based on the max path number information, the quantity that is of the plurality of paths and that corresponds to a different QoS parameter. For example, if a QoS parameter requirement of the first QoS flow is higher (a reliability requirement is higher), more paths are required for transmission of the first QoS flow. However, a quantity of determined paths is constrained by the max path number, in other words, the quantity that is of the plurality of paths and that is determined by the access network device cannot exceed the max path number.

According to a second aspect, a data transmission method is provided. The method may be executed by a core network element. The method includes: The core network element determines to use a multi-path transmission mode for a first quality of service QoS flow of a terminal device, where the multi-path transmission mode is a transmission mode including at least two paths that are in a first path set, the first path set includes N indirect paths, and a direct path between an access network device and the terminal device, the N indirect paths include indirect paths that are between the access network device and the terminal device and that pass through N relay terminal devices, and N is an integer greater than or equal to 1. The core network element sends first indication information, where the first indication information indicates to use the multi-path transmission mode for the first QoS flow.

In some embodiments, the core network element determines to use the multi-path transmission mode for the first quality of service QoS flow of the terminal device, to improve reliability of data transmission. In addition, the core network element further indicates a preference of the multi-path transmission mode to the access network device, in other words, the multi-path transmission mode includes an indirect transmission mode that is performed through a relay terminal device, so that the access network device has a specific preference when determining a plurality of paths.

With reference to the second aspect, in some possible implementations, the first indication information further includes a specific form of the multi-path transmission mode, namely, duplication transmission or split transmission.

For example, if the specific form of the multi-path transmission mode is duplication transmission, in an example of a downlink QoS flow, the access network device duplicates a packet of the first QoS flow, and performs transmission of same packets to the terminal device through the plurality of paths, and then the terminal device deduplicates the packets. If the specific form of the multi-path transmission mode is split transmission, in an example of a downlink QoS flow, the access network device performs transmission of different packets of the first QoS flow to the terminal device through different paths.

In some embodiments, when the access network device performs transmission of the same packets of the first QoS flow through the at least two paths, reliability of the packet transmission can be improved; or when the access network device splits a packet of the first QoS flow, and performs transmission of the different packets through the at least two paths, a transmission rate of the first QoS flow can be increased.

With reference to the second aspect, in some possible implementations, the core network element determines, based on authorization information, to use the multi-path transmission mode for the first QoS flow, where the authorization information indicates that the terminal device is authorized to serve as a remote terminal device or is authorized to use the multi-path transmission mode.

With reference to the second aspect, in some possible implementations, the core network element sends second indication information to the terminal device, where the second indication information indicates to use the multi-path transmission mode for a first data flow, and the first data flow includes a first service flow or the first QoS flow.

With reference to the second aspect, in some possible implementations, the core network element receives request information from the terminal device, where the request information requests to use the multi-path transmission mode for the first QoS flow. The core network element determines, based on the request information, to use the multi-path transmission mode for the first QoS flow.

With reference to the second aspect, in some possible implementations, the core network element receives request information from the terminal device, where the request information requests to use the multi-path transmission mode for the first service flow. The core network element allocates the first QoS flow to the first service flow, and the core network element determines, based on the request information, to use the multi-path transmission mode for the first QoS flow.

With reference to the second aspect, in some possible implementations, the core network element receives fourth information from the access network device, where the fourth information indicates that a QoS parameter of the first QoS flow is not fulfilled. The core network element determines, based on the fourth information, to use the multi-path transmission mode for the first QoS flow of the terminal device.

With reference to the second aspect, in some possible implementations, the core network element sends max path number information to the access network device, where the max path number information is for determining a quantity of a plurality of paths that are for transmission of the first QoS flow.

According to a third aspect, a data transmission method is provided. The method may be performed by a terminal device, or may be performed by a component (such as a chip or a chip system) configured in the terminal device. This is not limited in this application. The method includes: The terminal device determines to use a multi-path transmission mode for a first data flow, where the first data flow includes a first service flow or a first quality of service QoS flow, the multi-path transmission mode is a transmission mode including at least two paths that are in a first path set, the first path set includes N indirect paths, and a direct path between an access network device and the terminal device, the N indirect paths include indirect paths that are between the access network device and the terminal device and that pass through N relay terminal devices, and N is an integer greater than or equal to 1. The terminal device sends request information, where the request information requests to use the multi-path transmission mode for the first data flow.

In some embodiments, the terminal device determines to use the multi-path transmission mode for the first quality of service QoS flow, to improve reliability of data transmission.

With reference to the third aspect, in some possible implementations, the terminal device receives second indication information from a core network element, where the second indication information indicates to use the multi-path transmission mode for the first data flow, and the terminal device determines, based on the second indication information, to use the multi-path transmission mode for the first data flow.

With reference to the third aspect, in some possible implementations, the terminal device receives fourth information, where the fourth information indicates that a QoS parameter of the first QoS flow is not fulfilled. The terminal device determines, based on the fourth information, to use the multi-path transmission mode for the first QoS flow. Alternatively, the terminal device determines, based on the fourth information and authorization information, to use the multi-path transmission mode for the first QoS flow, where the authorization information indicates that the terminal device is authorized to serve as a remote terminal device or is authorized to use the multi-path transmission mode.

With reference to the third aspect, in some possible implementations, the terminal device receives second information from the access network device, where the second information is for triggering the terminal device to report information about a relay terminal device. The terminal device sends information about at least one relay terminal device to the access network device, and the information about the at least one relay terminal device is for establishing the indirect path that is in the multi-path transmission mode.

In some embodiments, the terminal device can receive the second information from the access network device, so as to participate in relay discovery. This avoids a case in which the terminal device cannot report information, so that the access network device can effectively complete establishment of a plurality of paths.

According to a fourth aspect, a data transmission method is provided. The method may be performed by a terminal device, or may be performed by a component (such as a chip or a chip system) configured in the terminal device. This is not limited in this application. The method includes: The terminal device determines to use a multi-path transmission mode for transmission of a first data flow, where the multi-path transmission mode is a mode of transmission through at least two paths. The terminal device performs transmission of the first data flow through at least two paths that are in a second path set, where the second path set includes a direct network communication path on which the terminal device accesses a network and an indirect network communication path on which the terminal device accesses the network through a relay terminal device.

In some embodiments, the terminal device determines the at least two paths for transmission of data, so that when communication quality of one of the at least two paths is poor, reliability or a rate of data transmission can be improved. Specifically, when the terminal device performs transmission of same data of the first data flow through the at least two paths, the reliability of the data transmission can be improved; when the terminal device performs transmission of different data of the first data flow through the at least two paths, the transmission rate of the first data flow can be improved. In addition, in this solution, the terminal device determines to use the multi-path transmission mode for the first data flow. Therefore, the terminal device has high decision autonomy.

With reference to the fourth aspect, in some possible implementations, the indirect network communication path includes a first indirect network communication path on which the terminal device accesses the network through a first relay terminal device.

With reference to the fourth aspect, in some possible implementations, the first indirect network communication path includes: a layer-2 relay indirect network communication path and/or a layer-3 relay indirect network communication path.

With reference to the fourth aspect, in some possible implementations, the indirect network communication path further includes a second indirect network communication path on which the terminal device accesses the network through a second relay terminal device.

With reference to the fourth aspect, in some possible implementations, the first relay terminal device is a layer-3 relay terminal device.

With reference to the fourth aspect, in some possible implementations, the terminal device determines, based on a route selection policy of the terminal device or based on a proximity-based service policy of the terminal device, to use the multi-path transmission mode for transmission of the first data flow. Alternatively, if a single-path transmission mode is used for transmission of the first data flow, and a QoS parameter of the first data flow is not fulfilled, the terminal device determines to use the multi-path transmission mode for transmission of the first data flow. The single-path transmission mode is a transmission mode in which the terminal device performs transmission of the first data flow through a protocol data unit PDU session, or the single-path transmission mode is a transmission mode in which the terminal device performs transmission of the first data flow through a layer-3 relay terminal device.

In some embodiments, the terminal device determines, according to the foregoing policy, to perform multi-path transmission including the layer-3 relay indirect path on the first data flow, so that controllability of transmission of the first data flow can be improved. Alternatively, In some embodiments, when the terminal device uses the single-path transmission mode for transmission of the first data flow, the QoS parameter of the first data flow is not fulfilled. In this case, the terminal device may determine to use the multi-path transmission mode for transmission of the first data flow, so as to fulfill the QoS parameter. In other words, when the QoS parameter of the first data flow is not fulfilled, the terminal device is triggered to establish a path (for example, a direct path or an indirect path), so that transmission of the first data flow may be performed through a plurality of paths, thereby improving flexibility of performing transmission of the first data flow.

With reference to the fourth aspect, in some possible implementations, the method further includes: The terminal device receives the route selection policy of the terminal device or the proximity-based service policy of the terminal device.

With reference to the fourth aspect, in some possible implementations, that the terminal device determines to use the multi-path transmission mode for transmission of the first data flow includes: The terminal device determines to use, for transmission of the first data flow, the multi-path transmission mode including the layer-3 relay indirect network communication path, where the multi-path transmission mode including the layer-3 relay indirect network communication path is a mode of transmission through at least two paths, and the at least two paths include the layer-3 relay indirect network communication path.

With reference to the fourth aspect, in some possible implementations, that the terminal device determines to use the multi-path transmission mode for transmission of the first data flow includes: The terminal device receives third indication information, where the third indication information indicates to use the multi-path transmission mode for the first data flow, and the at least two paths in the multi-path transmission mode include a layer-3 relay indirect network communication path, or the third indication information indicates to use, for the first data flow, the multi-path transmission mode including a layer-3 relay indirect network communication path, the multi-path transmission mode including the layer-3 relay indirect network communication path is a mode of transmission through at least two paths, and the at least two paths include the layer-3 relay indirect network communication path.

With reference to the fourth aspect, in some possible implementations, the at least two paths in the second path set include a third indirect network communication path, and the third indirect network communication path is the layer-3 relay indirect network communication path on which the terminal device accesses the network through the first relay terminal device.

With reference to the fourth aspect, in some possible implementations, the method further includes: The terminal device receives the route selection policy of the terminal device or the proximity-based service policy of the terminal device, where the route selection policy of the terminal device or the proximity-based service policy of the terminal device includes the third indication information.

With reference to the fourth aspect, in some possible implementations, the method further includes: When there is no indirect network communication path for transmission of the first data flow, the terminal device establishes an indirect network communication path that is for transmission of the first data flow. Alternatively, when there is no direct network communication path for transmission of the first data flow, the terminal device establishes a direct network communication path that is for transmission of the first data flow.

According to a fifth aspect, a data transmission apparatus is provided. The apparatus may be an access network device, or the apparatus may be a component (such as a chip or a chip system) configured in the access network device. This is not limited in this application. The apparatus includes a processing unit and a transceiver unit. The processing unit is configured to determine a plurality of paths that are for transmission of a first quality of service QoS flow of a terminal device, where the plurality of paths include at least two paths that are in a first path set, the first path set includes N indirect paths, and a direct path between the access network device and the terminal device, the N indirect paths include indirect paths that are between the access network device and the terminal device and that pass through N relay terminal devices, and N is an integer greater than or equal to 1. The transceiver unit is configured to perform transmission of the first QoS flow through the plurality of paths.

In some embodiments, the access network device determines the at least two paths for transmission of data, so that when communication quality of one of the at least two paths is poor, reliability of data transmission can be improved.

With reference to the fifth aspect, in some possible implementations, the transceiver unit is further configured to receive first indication information from a core network element, where the first indication information indicates to use a multi-path transmission mode for the first QoS flow. The processing unit is further configured to determine, based on the first indication information, the plurality of paths that are for transmission of the first QoS flow of the terminal device.

With reference to the fifth aspect, in some possible implementations, the first indication information further includes a specific form of the multi-path transmission mode, namely, duplication transmission or split transmission.

In some embodiments, when the access network device performs transmission of same packets of the first QoS flow through the at least two paths, reliability of packet transmission can be improved; when the access network device splits a packet of the first QoS flow, and performs transmission of different packets through the at least two paths, a transmission rate of the first QoS flow can be increased.

With reference to the fifth aspect, in some possible implementations, before determining the plurality of paths that are for transmission of the first QoS flow of the terminal device, the processing unit is further configured to determine to use the multi-path transmission mode for the first QoS flow.

With reference to the fifth aspect, in some possible implementations, the multi-path transmission mode includes a multi-path transmission mode that is performed through a relay terminal device.

With reference to the fifth aspect, in some possible implementations, the processing unit is further configured to determine, based on authorization information, to use the multi-path transmission mode for the first QoS flow, where the authorization information indicates that the terminal device is authorized to serve as a remote terminal device or is authorized to use the multi-path transmission mode.

With reference to the fifth aspect, in some possible implementations, the transceiver unit is further configured to receive request information from the terminal device, where the request information requests to use the multi-path transmission mode for transmission of the first QoS flow. The processing unit is further configured to determine, based on the request information, to use the multi-path transmission mode for the first QoS flow. Alternatively, the processing unit is further configured to determine, based on the request information and authorization information, to use the multi-path transmission mode for the first QoS flow, where the authorization information indicates that the terminal device is authorized to serve as a remote terminal device or is authorized to use the multi-path transmission mode.

With reference to the fifth aspect, in some possible implementations, when a QoS parameter of the first QoS flow is not fulfilled, the processing unit determines to use the multi-path transmission mode for the first QoS flow.

With reference to the fifth aspect, in some possible implementations, when the QoS parameter of the first QoS flow of which transmission is performed through the plurality of paths is not fulfilled, the transceiver unit is further configured to send first information to the core network element, where the first information indicates that the QoS parameter of the first QoS flow is not fulfilled, or the first information indicates that the QoS parameter of the first QoS flow is not fulfilled when the multi-path transmission mode is used for the first QoS flow.

With reference to the fifth aspect, in some possible implementations, the transceiver unit is further configured to send second information to the terminal device, where the second information is for triggering the terminal device to report information about a relay terminal device. The transceiver unit is further configured to receive information about at least one relay terminal device from the terminal device. The processing unit is further configured to establish, based on the information about the at least one relay terminal device, an indirect path that is in the plurality of paths.

With reference to the fifth aspect, in some possible implementations, the processing unit is further configured to send third information to the at least one relay terminal device, where the third information is for triggering the at least one relay terminal device to participate in relay discovery.

With reference to the fifth aspect, in some possible implementations, the processing unit is further configured to establish a dedicated data radio bearer for the first QoS flow, and the transceiver unit is configured to perform transmission of the first QoS flow to the terminal device on the data radio bearer through the plurality of paths.

With reference to the fifth aspect, in some possible implementations, the transceiver unit is further configured to receive max path number information corresponding to the multi-path transmission mode, and the processing unit is further configured to determine a quantity of the plurality of paths based on the max path number information.

According to a sixth aspect, a data transmission apparatus is provided. The apparatus may be a core network element. The apparatus includes a transceiver unit and a processing unit. The processing unit is configured to determine to use a multi-path transmission mode for a first quality of service QoS flow of a terminal device, where the multi-path transmission mode is a transmission mode including at least two paths that are in a first path set, the first path set includes N indirect paths, and a direct path between an access network device and the terminal device, the N indirect paths include indirect paths that are between the access network device and the terminal device and that pass through N relay terminal devices, and N is an integer greater than or equal to 1. The transceiver unit is configured to send first indication information, where the first indication information indicates to use the multi-path transmission mode for the first QoS flow.

In some embodiments, the core network element determines to use the multi-path transmission mode for the first quality of service QoS flow of the terminal device, to improve reliability of data transmission. In addition, the core network element further indicates a preference of the multi-path transmission mode to the access network device, in other words, the multi-path transmission mode includes an indirect transmission mode that is performed through a relay terminal device, so that the access network device has a specific preference when determining a plurality of paths.

With reference to the sixth aspect, in some possible implementations, the first indication information further includes a specific form of the multi-path transmission mode, namely, duplication transmission or split transmission.

In some embodiments, when the access network device performs transmission of same packets of the first QoS flow through the at least two paths, reliability of packet transmission can be improved; when the access network device splits a packet of the first QoS flow, and performs transmission of different packets through the at least two paths, a transmission rate of the first QoS flow can be increased.

With reference to the sixth aspect, in some possible implementations, the processing unit is further configured to determine, based on authorization information, to use the multi-path transmission mode for the first QoS flow, where the authorization information indicates that the terminal device is authorized to serve as a remote terminal device or is authorized to use the multi-path transmission mode.

With reference to the sixth aspect, in some possible implementations, the transceiver unit is further configured to send second indication information to the terminal device, where the second indication information indicates to use the multi-path transmission mode for a first data flow, and the first data flow includes a first service flow or the first QoS flow.

With reference to the sixth aspect, in some possible implementations, the transceiver unit is further configured to receive request information from the terminal device, where the request information requests to use the multi-path transmission mode for the first QoS flow. The processing unit is further configured to determine, based on the request information, to use the multi-path transmission mode for the first QoS flow.

With reference to the sixth aspect, in some possible implementations, the transceiver unit is further configured to receive request information from the terminal device, where the request information requests to use the multi-path transmission mode for the first service flow. The processing unit is further configured to allocate the first QoS flow to the first service flow, and the processing unit is further configured to determine, based on the request information, to use the multi-path transmission mode for the first QoS flow.

With reference to the sixth aspect, in some possible implementations, the transceiver unit is further configured to receive fourth information from the access network device, where the fourth information indicates that a QoS parameter of the first QoS flow is not fulfilled, and the processing unit is further configured to determine, based on the fourth information, to use the multi-path transmission mode for the first QoS flow of the terminal device.

With reference to the sixth aspect, in some possible implementations, the transceiver unit is further configured to send max path number information to the access network device, where the max path number information is for determining a quantity of a plurality of paths that are for transmission of the first QoS flow.

According to a seventh aspect, a data transmission apparatus is provided. The apparatus may be a terminal device, or the apparatus may be a component (such as a chip or a chip system) configured in the terminal device. This is not limited in this application. The apparatus includes a transceiver unit and a processing unit. The processing unit is configured to: determine to use a multi-path transmission mode for a first data flow, where the first data flow includes a first service flow or a first quality of service QoS flow, the multi-path transmission mode is a transmission mode including at least two paths that are in a first path set, the first path set includes N indirect paths, and a direct path between an access network device and the terminal device, the N indirect paths include indirect paths that are between the access network device and the terminal device and that pass through N relay terminal devices, and N is an integer greater than or equal to 1. The transceiver unit is configured to send request information, where the request information requests to use the multi-path transmission mode for the first data flow.

In some embodiments, the terminal device determines to use the multi-path transmission mode for the first quality of service QoS flow, to improve reliability of data transmission.

With reference to the seventh aspect, in some possible implementations, the transceiver unit is further configured to receive second indication information from a core network element, where the second indication information indicates to use the multi-path transmission mode for the first data flow, and the processing unit is further configured to determine, based on the second indication information, to use the multi-path transmission mode for the first data flow.

With reference to the seventh aspect, in some possible implementations, the transceiver unit is further configured to receive fourth information, where the fourth information indicates that a QoS parameter of the first QoS flow is not fulfilled. The processing unit is further configured to determine, based on the fourth information, to use the multi-path transmission mode for the first QoS flow. Alternatively, the processing unit is further configured to determine, based on the fourth information and authorization information, to use the multi-path transmission mode for the first QoS flow, where the authorization information indicates that the terminal device is authorized to serve as a remote terminal device or is authorized to use the multi-path transmission mode.

With reference to the seventh aspect, in some possible implementations, the transceiver unit is further configured to receive second information from the access network device, where the second information is for triggering the terminal device to report information about a relay terminal device; and the transceiver unit is further configured to send information about at least one relay terminal device to the access network device, where the information about the at least one relay terminal device is for establishing the indirect path that is in the multi-path transmission mode.

According to an eighth aspect, a communication apparatus is provided. The apparatus may be the access network device in the first aspect, or an electronic device configured in the access network device, or a relatively large device including the access network device. The apparatus is configured to perform the method provided in the first aspect.

The apparatus includes a processor. The processor is coupled to a memory, and may be configured to execute instructions that are in the memory, to implement the method in any one of the first aspect or the possible implementations of the first aspect. In some embodiments, the apparatus further includes the memory. The memory and the processor may be separately deployed, or may be centrally deployed. In some embodiments, the apparatus further includes a communication interface, and the processor is coupled to the communication interface.

In some embodiments, the communication interface may be a transceiver or an input/output interface.

In some embodiments, the apparatus is a chip configured in the access network device. When the apparatus is the chip configured in the access network device, the communication interface may be an input/output interface, an interface circuit, an output circuit, an input circuit, a pin, a related circuit, or the like on the chip or a chip system. The processor may alternatively be a processing circuit or a logic circuit.

In some embodiments, the transceiver may be a transceiver circuit. In some embodiments, the input/output interface may be an input/output circuit.

In some embodiments, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a ninth aspect, a communication apparatus is provided. The apparatus may be the core network element in the second aspect, or an electronic device configured in the core network element, or a relatively large device including the core network element. The apparatus is configured to perform the method provided in the second aspect.

The apparatus includes a processor. The processor is coupled to a memory, and may be configured to execute instructions that are in the memory, to implement the method in any one of the second aspect or the possible implementations of the second aspect. In some embodiments, the apparatus further includes the memory. The memory and the processor may be separately deployed, or may be centrally deployed. In some embodiments, the apparatus further includes a communication interface, and the processor is coupled to the communication interface.

In some embodiments, the communication interface may be a transceiver or an input/output interface.

In some embodiments, the apparatus is a chip configured in the core network element. When the apparatus is the chip configured in the core network element, the communication interface may be an input/output interface, an interface circuit, an output circuit, an input circuit, a pin, a related circuit, or the like on the chip or a chip system. The processor may alternatively be a processing circuit or a logic circuit.

In some embodiments, the transceiver may be a transceiver circuit. In some embodiments, the input/output interface may be an input/output circuit.

In some embodiments, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a tenth aspect, a communication apparatus is provided. The apparatus may be the terminal device in the third aspect or the fourth aspect, or an electronic device configured in the terminal device, or a relatively large device including the terminal device. The apparatus is configured to perform the method provided in the third aspect or the fourth aspect.

The apparatus includes a processor. The processor is coupled to a memory, and may be configured to execute instructions that are in the memory, to implement the method in any one of the third aspect or the fourth aspect or the possible implementations of the third aspect or the fourth aspect. In some embodiments, the apparatus further includes the memory. The memory and the processor may be separately deployed, or may be centrally deployed. In some embodiments, the apparatus further includes a communication interface, and the processor is coupled to the communication interface.

In some embodiments, the communication interface may be a transceiver or an input/output interface.

In some embodiments, the apparatus is a chip configured in the terminal device. When the apparatus is the chip configured in the terminal device, the communication interface may be an input/output interface, an interface circuit, an output circuit, an input circuit, a pin, a related circuit, or the like on the chip or a chip system. The processor may alternatively be a processing circuit or a logic circuit.

In some embodiments, the transceiver may be a transceiver circuit. In some embodiments, the input/output interface may be an input/output circuit.

In some embodiments, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eleventh aspect, a computer program product is provided. The computer program product includes a computer program (which may also be referred to as code or instructions). When the computer program is run, a computer is enabled to perform the method in any one of the first aspect to the fourth aspect, and any possible implementation of the first aspect to the fourth aspect.

According to a twelfth aspect, a computer-readable storage medium is provided. The computer-readable storage medium stores a computer program (which may also be referred to as code or instructions). When the computer-readable storage medium is run on a computer, the computer is enabled to perform the method in any one of the first aspect to the fourth aspect and any possible implementation of the first aspect to the fourth aspect.

According to a thirteenth aspect, a communication system is provided, and includes the foregoing access network device, core network element, and terminal device. In some embodiments, the communication system further includes a relay terminal device.

BRIEF DESCRIPTION OF DRAWINGS

FIG. 8 is a schematic flowchart in which a terminal device determines to use a multi-path transmission mode according to an embodiment of this application;

FIG. 9 is another schematic flowchart of using a multi-path transmission mode according to an embodiment of this application;

FIG. 10 is a schematic block diagram of a communication apparatus according to an embodiment of this application;

DETAILED DESCRIPTION

The following describes the technical solutions in this application with reference to the accompanying drawings.

Figures 1, 2:
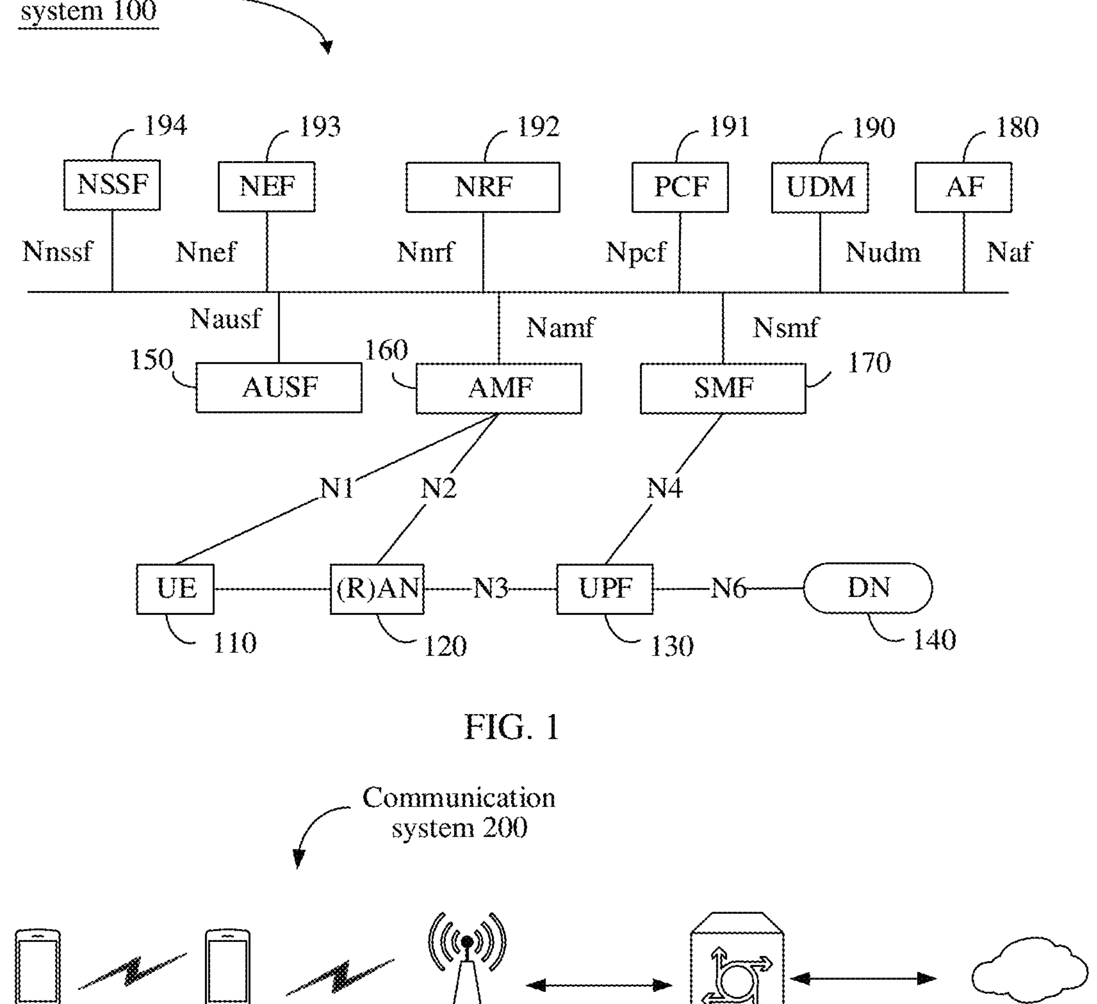
FIG. 1 is a schematic diagram of a communication system 100 applicable to an embodiment of this application.
FIG. 2 is a schematic diagram in which a terminal device accesses a network with assistance of a relay terminal device according to this application.

FIG. 1 is a schematic diagram of a network architecture according to an embodiment of this application. As shown in FIG. 1, the network architecture may include user equipment 110, a (radio) access network device 120, a user plane network element 130, a data network 140, an authentication server 150, a mobility management network element 160, a session management network element 170, an application network element 180, a unified data management network element 190, a policy control network element 191, a network function repository function network element 192, a network exposure network element 193, a network slice selection function network element 194, and the like. The following separately describes the network elements in the network architecture.

1. User equipment (UE) 110: The user equipment may also be referred to as a terminal, an access terminal, a subscriber unit, a subscriber station, a mobile station, a remote station, a remote terminal, a mobile device, a user terminal, a wireless communication device, a user agent, or a user apparatus. The terminal in embodiments of this application may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved network, or the like.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not merely a hardware device, but is used to implement a powerful function through software support, data interaction, and cloud interaction. A generalized wearable intelligent device includes a full-featured and large-size device that can implement complete or partial functions without depending on a smartphone, such as a smart watch or smart glasses, and a device that focuses on only one type of application and needs to work with another device such as a smartphone, such as various smart bracelets, smart jewelry, or the like for monitoring physical signs.

2. (Radio) access network ((R)AN) device 120: The access network device may also be referred to as an access device. The (R)AN can manage a radio resource, provide an access service for user equipment, and complete forwarding of user equipment data between the user equipment and a core network. The (R)AN may also be understood as a base station in a network.

For example, the access network device in this embodiment of this application may be any communication device that has a wireless transceiver function and is configured to communicate with the user equipment. The access network device includes but is not limited to an evolved NodeB (eNB), a radio network controller (RNC), a NodeB (NB), a base station controller (BSC), a base transceiver station (BTS), a home base station (for example, a home evolved NodeB, HeNB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the access network device may be a gNB or a transmission point (TRP or TP) in a 5G system such as an NR system, may be one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployment, the gNB may include a central unit (CU) and a DU. The gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. The information at the RRC layer is generated by the CU, and is finally encapsulated into PHY layer information by using the PHY layer of the DU, or is converted from PHY layer information. Therefore, in this architecture, it may be considered that higher layer signaling such as RRC layer signaling is sent by the DU, or is sent by the DU and an AAU. It may be understood that the access network device may be a device including one or more of a CU node, a DU node, and an AAU node. In addition, the CU may be divided into an access network device in a radio access network (RAN), or the CU may be divided into an access network device in a core network (CN). This is not limited in this application.

3. The user plane network element 130 functions as an interface to a data network, and completes functions such as user plane data forwarding, charging statistics collection based on session/service flow-level, and bandwidth limiting, namely, packet routing and forwarding, quality of service (QoS) processing of user plane data, and the like.

In a 5G communication system, the user plane network element may be a user plane function (UPF) network element.

4. The data network 140 provides, for example, an operator service, Internet access, or a third-party service, and includes a server. A server side implements video source encoding, rendering, and the like. In a 5G communication system, the data network may be a data network (DN).

5. The authentication server 150 performs security authentication on a user. In a 5G communication system, the authentication server may be an authentication server function (AUSF) network element.

6. The mobility management network element 160 is mainly used for mobility management, access management, and the like. In a 5G communication system, the mobility management network element may be an access and mobility management function (AMF), and mainly performs functions such as mobility management and access authentication/authorization. In addition, the mobility management network element 160 is also responsible for transferring a user policy between a terminal and a policy control function (PCF) network element.

7. The session management network element 170 is mainly configured to manage a session, allocate and manage an Internet protocol (IP) address of user equipment, select a manageable user plane function, serve as a termination point of a policy control and charging function interface, and notify downlink data.

In a 5G communication system, the session management network element may be a session management function (SMF) network element, and completes terminal IP address allocation, UPF selection, charging and QoS policy control, and the like.

8. Application network element 180: In a 5G communication system, the application network element may be an application function (AF) network element, represents an application function of a third party or an operator, is an interface for obtaining external application data in a 5G network, and is mainly used to transfer a requirement of an application side for a network side.

9. The unified data management network element 190 is responsible for managing a user identifier, subscription data, and authentication data, and managing registration of a serving network element of a user. In a 5G communication system, the unified data managed network element may be a unified data management (UDM).

10. The policy control network element 191 includes a user subscription data management function, a policy control function, a charging policy control function, a quality of service (QoS) control function, and the like, is a unified policy framework used to guide network behavior, and provides policy rule information and the like for a control plane function network element (for example, an AMF or an SMF network element).

In a 5G communication system, the policy control network element may be a PCF.

11. The network slice selection function network element 194 is responsible for selecting a network slice for UE. In a 5G communication system, the application network element may be a network slice selection function (NSSF) network element.

12. The network function repository function network element 192 provides storage and selection functions of network function entity information for another core network element. In a 5G communication system, the network element may be a network function repository function (NRF) network element.

13. Network exposure network element 193: In a 5G communication system, the network exposure network element may be a network exposure function (NEF) network element, is mainly used to expose a service and a capability of a 3GPP network function to an AF, and may also enable the AF to provide information for the 3GPP network function.

In a future communication system, for example, a 6G communication system, the network element or the device may still use a name of the network element or the device in the 5G communication system, or may have another name. This is not limited in embodiments of this application. A function of the network element or the device may be completed by an independent network element, or may be completed by several network elements together. During actual deployment, network elements in a core network may be deployed on a same physical device or different physical devices. For example, in a possible deployment, an AMF and an SMF may be deployed on a same physical device. For another example, a network element of a 5G core network and a network element of a 4G core network may be deployed on a same physical device. This is not limited in embodiments of this application.

It may be understood that FIG. 1 is merely an example, and does not constitute any limitation on the protection scope of this application. The communication methods provided in embodiments of this application may further relate to a network element that is not shown in FIG. 1. Certainly, the communication methods provided in embodiments of this application may include only some network elements shown in FIG. 1.

In the network architecture shown in FIG. 1, the terminal is connected to the AMF through an N1 interface, the (R)AN is connected to the AMF through an N2 interface, and the (R)AN is connected to the UPF through an N3 interface. UPFs are connected through an N9 interface, and the UPF is connected to the DN through an N6 interface. The SMF controls the UPF through an N4 interface.

It may be understood that the foregoing network architecture used in embodiments of this application is merely an example for description, and a network architecture applicable to embodiments of this application is not limited thereto. Any network architecture that can implement functions of the foregoing network elements is applicable to embodiments of this application.

With rapid development of mobile communication, universal use of new service types, for example, data services such as video chat and VR/AR, increases a bandwidth requirement of a user. Besides, D2D communication has been applied to 4G and 5G network systems. In an existing network architecture (as shown in FIG. 1), a terminal device may be directly connected to an access network device for communication. Certainly, the terminal device may also support communication with the access network device through a relay terminal device. In this case, communication between the terminal device and the relay terminal device is the D2D communication. The D2D communication may enable the terminal device to share a spectrum resource with a cell user under control of a cell network, so that spectrum resource utilization can be effectively improved.

FIG. 2 is a schematic diagram in which a terminal device accesses a network with assistance of a relay terminal device.

When a remote terminal device 10 is located outside coverage of an access network device 30, or a signal for communication between the remote terminal device 10 (for example, remote UE) and the access network device 30 (for example, a RAN) is poor, a communication mode in which the remote terminal device 10 is connected to the access network device 30 through a relay terminal device 20 (for example, relay UE) may be established, so that the remote terminal device 10 can communicate with the access network device 30. As shown in FIG. 2, the remote terminal device 10 may be connected to a network-side device through a relay terminal device. The network-side device shown in FIG. 2 includes the access network device 30 and a UPF. Certainly, the network-side device shown in FIG. 2 is merely an example. FIG. 2 may further include another network-side device. This is not limited in this application.

It should be understood that a remote terminal device is a terminal device that is connected to an access network device through indirect communication. For example, the remote terminal device cannot directly communicate with the access network device, and assistance of a relay terminal device is required. In other words, indirect communication is used when the remote terminal device and the access network device are indirectly connected, that is, the remote terminal device and the access network device communicate with each other through an indirect path. The relay terminal device is a terminal device that assists the remote terminal device in accessing a network-side device. When the remote terminal device communicates with the access network device without a need of assistance of the relay terminal device, the remote terminal device and the access network device are in a direct connection state, and direct communication is used when the remote terminal device and the access network device are directly connected, that is, the remote terminal device and the access network device communicate with each other through a direct path.

Figure 3:
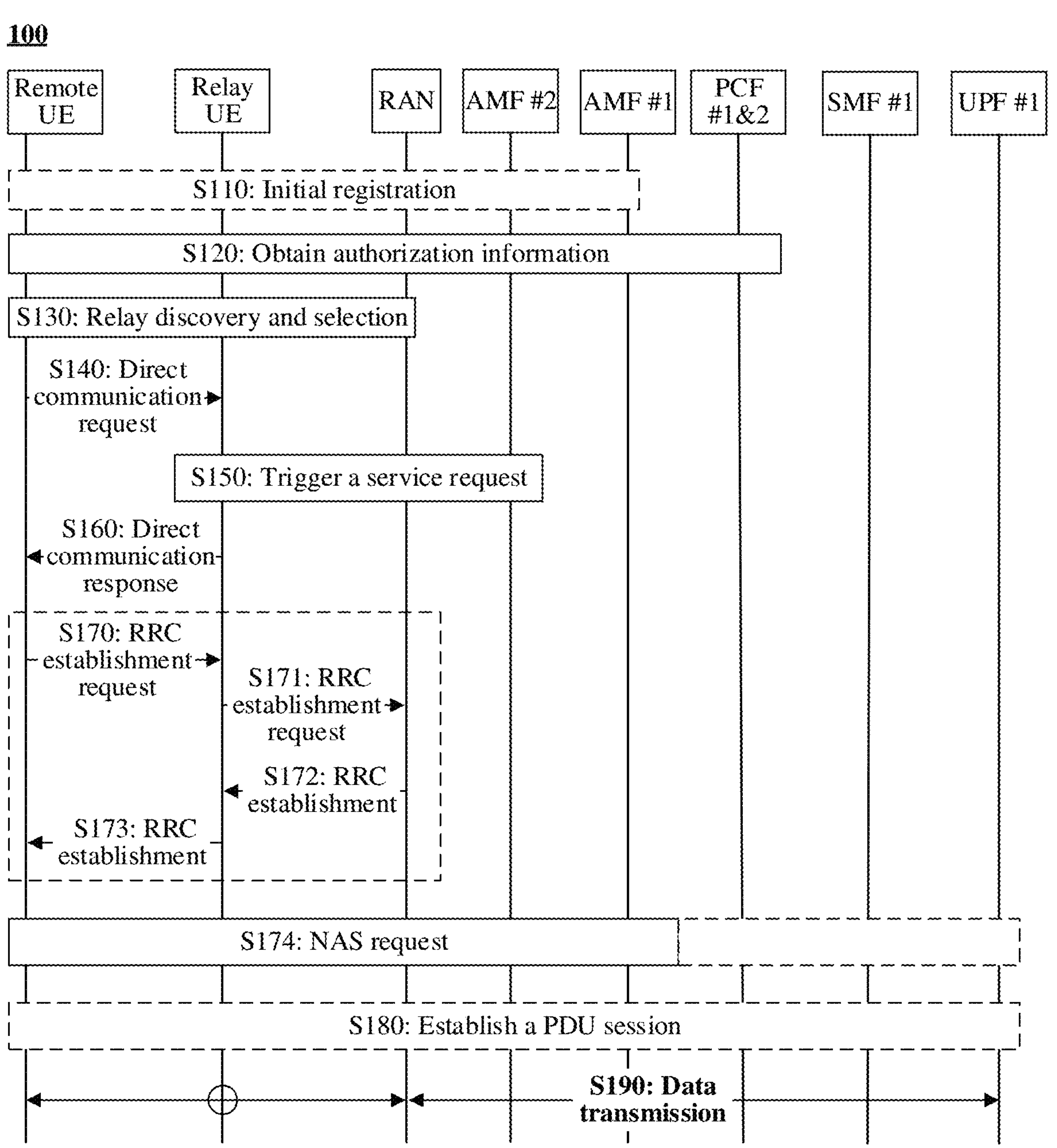
FIG. 3 is a schematic flowchart in which a remote terminal device supports layer-2 relay communication according to this application.

FIG. 3 is a schematic flowchart in which a remote terminal device supports layer-2 relay (L2 relay) communication. A method 100 shown in FIG. 3 includes the following steps.

In some embodiments, in step S110, the remote terminal device (an example is remote UE in the figure) and a relay terminal device (an example is relay UE in the figure) are initially registered with a network.

It should be understood that the remote terminal device may not be registered when the remote terminal device is not directly connected to the network. In this case, the remote terminal device needs to be registered in step S174.

Step S120: The remote terminal device obtains authorization information from a PCF #1 (a PCF corresponding to the remote terminal device), where the authorization information includes that the UE is authorized to perform non-direct communication, that is, the UE may serve as the remote terminal device. The relay terminal device obtains authorization information from a PCF #2 (a PCF corresponding to the relay terminal device), where the authorization information includes that the UE is authorized to perform non-direct communication, that is, the UE may serve as the relay terminal device.

It should be understood that if the remote terminal device is not registered with the network, preconfigured authorization information is used. A PCF corresponding to a terminal device may be understood as a PCF that is responsible for providing a terminal device policy when the terminal device is registered.

Step S130: Perform a discovery and selection procedure of the relay terminal device.

Step S140: The remote terminal device sends a direct communication request message to the relay terminal device, where the request message is for establishing a PC5 link between the remote terminal device and the relay terminal device, and correspondingly, the relay terminal device receives the direct communication request message.

Step S150: After the relay terminal device receives the direct communication request message, if the relay terminal device is not in a connected mode (RRC connected), the relay terminal device triggers a service request (in other words, the relay terminal device initiates a service request) to an access network device (an example is a RAN in the figure) and an AMF #2 corresponding to the relay terminal device, so that the relay terminal device enters the connected mode.

Step S160: Corresponding to the direct communication request message sent by the remote terminal device, the relay terminal device sends a direct communication response message to the remote terminal device. Correspondingly, the remote terminal device receives the direct communication response message, so as to complete establishment of the PC5 link between the remote terminal device and the relay terminal device.

It should be understood that, after step S160, the remote terminal device has established the PC5 link with the relay terminal device, and in this case, the relay terminal device is in the connected state.

Step S170, step S171, step S172, and step S173 are a process in which the remote terminal device establishes an RRC connection to the access network device through the relay terminal device.

Specifically, the relay terminal device forwards uplink and downlink signaling (for example, an RRC establishment request message and an RRC establishment message) of the remote terminal device based on an access stratum configuration, so that the remote terminal device accesses the access network device, and establishes the RRC connection from the remote terminal device to the access network device.

Step S174: The remote terminal device initiates a non-access stratum (NAS) request to an AMF #1 (an AMF corresponding to the remote terminal device) through the access network device. The AMF #1 corresponding to the remote terminal device may be understood as an AMF that is responsible for mobility management of the remote terminal device when the remote terminal device is registered.

It should be understood that if the remote terminal device is not initially registered in step S110, the NAS message is an initial registration message. If the remote terminal device has been registered in step S110, the NAS message is a service request message.

In some embodiments, in the service request message, the remote terminal device may choose to activate a protocol data unit (PDU) session.

In some embodiments, if the NAS message is the initial registration message, the remote terminal device initiates a PDU session establishment procedure in step S180.

Step S190: After the PDU session is established, data between the remote terminal device and a UPF #1 (a UPF corresponding to the remote terminal device, namely, a UPF that performs transmission of data with the remote terminal device) is forwarded through the relay terminal device and the access network device. The relay terminal device forwards, based on the access stratum configuration, uplink and downlink data of which transmission is performed between the remote terminal device and the access network device.

It should be understood that a protocol stack between the relay terminal device and the access network device needs to support an adaptation layer that functions as follows: The adaptation layer is used by the relay terminal device and the access network device to distinguish the data of the remote terminal device.

Figure 4:
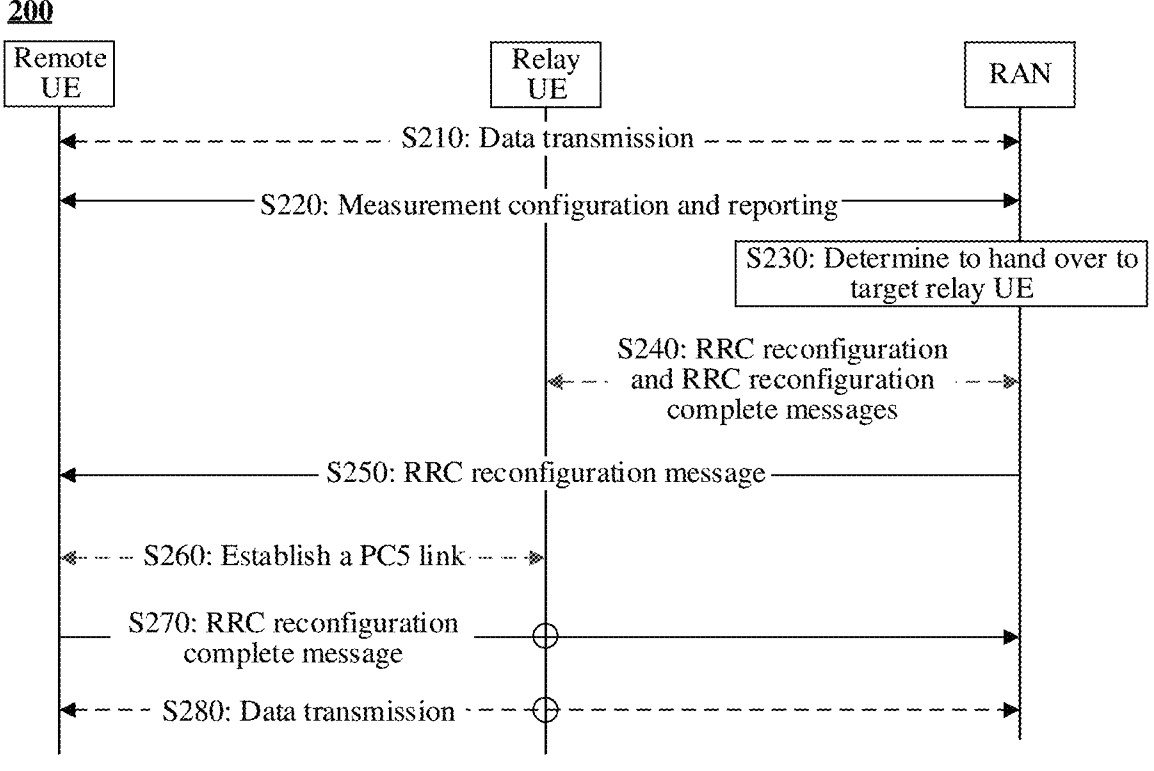
FIG. 4 is a schematic diagram of a communication procedure in which a remote terminal device switches from a direct connection to an indirect connection according to this application.

FIG. 4 is a schematic diagram of a communication procedure in which a remote terminal device switches from a direct connection to an indirect connection. A method 200 shown in FIG. 4 includes the following steps.

S210: When the remote terminal device (an example is remote UE in the figure) is directly connected to an access network device (an example is a RAN in the figure), transmission of uplink data and downlink data may be directly performed between the remote terminal device and the access network device, in other words, the uplink data and the downlink data of which transmission is performed between the remote terminal device and the access network device are not forwarded by a relay terminal device (an example is relay UE in the figure).

S220: After the remote terminal device accesses the access network device, the access network device first sends measurement configuration information to the remote terminal device, where the measurement configuration information includes signal threshold information, and the measurement configuration information indicates, to the remote terminal device, that when measured signal strength of a serving cell is less than the signal threshold information, the remote terminal device is allowed to send a discovery message to discover the relay terminal device. After discovering a candidate relay terminal device, the remote terminal device reports identification information of the candidate relay terminal device to the access network device.

S230: The access network device determines to hand over the remote terminal device to a target relay terminal device. Specifically, the access network device may select the target relay terminal device based on quality of a signal between the relay terminal device and the access network device and/or quality of a signal between the remote terminal device and the relay terminal device.

S240: The access network device sends configuration information (for example, an RRC reconfiguration message) to the target relay terminal device, where the configuration information is for performing transmission of signaling or data of the remote terminal device. Correspondingly, after receiving the configuration information, the target relay terminal device sends a response message (for example, an RRC reconfiguration complete message).

It should be understood that the configuration information may include identification information of the remote terminal device. In this way, when transmission of data of the remote terminal device is performed between the access network device and the target relay terminal device, a sender needs to add the identification information of the remote terminal device to a packet header (for example, at an adaptation layer), to help a receiver identify the data/signaling of the remote terminal device.

S250: The access network device sends configuration information, for example, an RRC reconfiguration message, to the remote terminal device, where the configuration information is for performing transmission of the signaling or the data of the remote terminal device to the access network device through the relay terminal device. The configuration information may include an identifier of the target relay terminal device and configuration information (for example, a logical channel number and a layer-2 identifier) of a PC5 link between the remote terminal device and the target relay terminal device. The identifier of the target relay terminal device is used by the remote terminal device to determine a relay terminal device through which the remote terminal device is connected to the access network device, and the configuration information of the PC5 link between the remote terminal device and the relay terminal device is for performing transmission of the data of the remote terminal device between the remote terminal device and the relay terminal device.

In some embodiments, the method 200 further includes the following steps.

Step S260: If there is no PC5 link between the remote terminal device and the target relay terminal device, establish the PC5 link between the remote terminal device and the target relay terminal device in this step.

Step S270: In response to the configuration message in S250, the remote terminal device sends, through the target relay terminal device, a response message of the configuration message to the access network device, for example, an RRC reconfiguration complete message (RRCReconfigurationComplete message).

Step S280: After the remote terminal device switches from direct communication with the access network device to indirect communication with the access network device performed through the relay terminal device, data between the remote terminal device and the access network device is forwarded by the relay terminal device.

The following describes a redundant transmission solution that can improve reliability of data transmission between an access network device and a terminal device.

The solution of redundant transmission between the access network device and the terminal device is to introduce dual connectivity (DC). Specifically, the access network device is divided into a master node (MN) and a secondary node (SN), and the dual connectivity is a connection between the MN and the terminal device and a connection between the SN and the terminal device.

An example of downlink redundant transmission is as follows: The MN receives data from a UPF, and may directly send the data to the terminal device through a direct path between the MN and the terminal device, or may send the data to the terminal device through an indirect path between the SN and the terminal device (in other words, the MN first sends the data to the SN, and then the SN sends the data to the terminal device). After receiving the data, a terminal device end performs deduplication.

In the foregoing solution in which the remote terminal device performs communication through a layer-2 relay terminal device, there is only one communication link between the remote terminal device and the access network device, namely, the remote terminal device—the relay terminal device—the access network device. In a solution in which the remote terminal device switches from direct communication to indirect communication, before the switching, the remote terminal device directly communicates with the access network device, and after the switching, the remote terminal device indirectly communicates with the access network device through the relay terminal device. It can be learned that there is only one communication link between the remote terminal device and the access network device before and after the switching. Consequently, reliability in a data transmission process is low.

The foregoing describes a solution that can improve reliability of data transmission, namely, a redundant transmission solution that can improve the reliability of the data transmission between the RAN and the UE. In the redundant transmission solution, in terms of network deployment, the MN and the SN need to have an interoperability relationship. This solution has a relatively high requirement on the network deployment.

This application provides a method for performing transmission of data through a plurality of paths, to improve reliability of data transmission between a RAN and UE.

Figure 5:
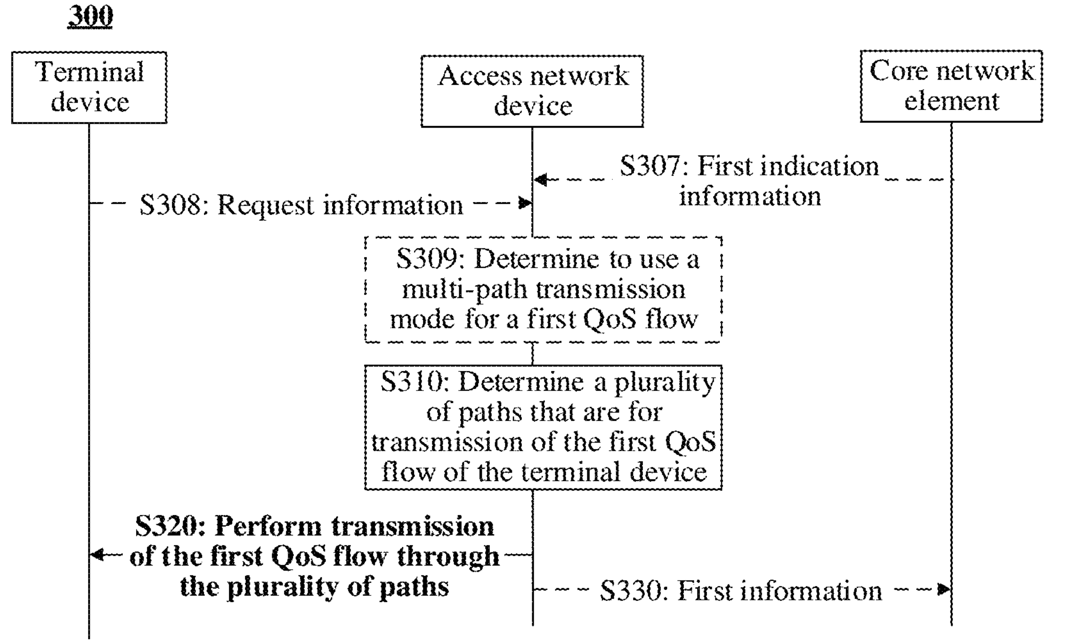
FIG. 5 is a schematic flowchart of using a multi-path transmission mode according to an embodiment of this application.

FIG. 5 is a schematic flowchart of using a multi-path transmission mode according to an embodiment of this application. A method 300 shown in FIG. 5 includes the following steps.

Step S310: An access network device determines a plurality of paths that are for transmission of a first quality of service QoS flow of a terminal device, where the plurality of paths include at least two paths that are in a first path set, the first path set includes N indirect paths, and a direct path between the access network device and the terminal device, the N indirect paths include indirect paths that are between the access network device and the terminal device and that pass through N relay terminal devices, and N is an integer greater than or equal to 1.

It should be understood that the N indirect paths include the indirect paths that are between the access network device and the terminal device and that pass through the N relay terminal devices. In other words, there are the N relay terminal devices between the access network device and the terminal device. Therefore, there are the N indirect paths between the access network device and the terminal device.

In some embodiments, that the access network device determines, in Manner 1 or Manner 2, the plurality of paths that are for transmission of the first QoS flow of the terminal device includes the following situations.

Manner 1: The access network device establishes the plurality of paths that are for transmission of the first QoS flow of the terminal device. When there is only one path between the access network device and the terminal device, the path may be a direct path or an indirect path, and the access network device needs to establish another path for the first QoS flow of the terminal device.

Case 1: The another path includes a direct path. The access network device sends an RRC reconfiguration message to the terminal device (for example, step S250), to establish the direct path to the terminal device.

Case 2: The another path includes an indirect path. The access network device receives measurement report information from the terminal device (for example, step S220), determines a target relay terminal device (for example, step S230), sends an RRC reconfiguration message to the relay terminal device (for example, step S240), and sends an RRC reconfiguration message to the terminal device (for example, step S250), to establish the indirect path to the terminal device.

Manner 2: The access network device selects the plurality of paths that are for transmission of the first QoS flow. When there are already a plurality of paths between the access network device and the terminal device, the access network device needs to select the paths of relay terminal devices for the first QoS flow of the terminal device. The access network device uses all or some of the existing paths between the access network device and the terminal device for transmission of the first QoS flow.

Specifically, the access network device may select, based on quality of signals between relay terminal devices and the access network device and/or quality of signals between a remote terminal device and relay terminal devices, the plurality of paths that are for transmission of the first QoS flow. For example, when quality of a signal between a relay terminal device and the access network device is lower than a specified threshold, the access network device does not select an indirect path that passes through the relay terminal device as a path for performing transmission of the first QoS flow. For another example, when quality of a signal between a relay terminal device and the access network device is higher than a specified threshold, or when quality of a signal between the remote terminal device and a relay terminal device is higher than a specified threshold, the access network device selects an indirect path that passes through the relay terminal device as a path for performing transmission of the first QoS flow.

For example, if there are already the plurality of paths between the access network device and the terminal device, the access network device determines whether transmission of the first QoS flow of the terminal device can be performed by using the existing plurality of paths. If the access network device determines that transmission of the first QoS flow of the terminal device can be performed by using the existing plurality of paths, the plurality of paths that are for transmission of the first QoS flow of the terminal device do not need to be established; or if the access network device determines that transmission of the first QoS flow of the terminal device cannot be performed by using the existing plurality of paths, the plurality of paths that are for transmission of the first QoS flow of the terminal device are established.

The following describes how the access network device determines a quantity of the plurality of paths.

In some embodiments, the access network device obtains max path number information corresponding to the multi-path transmission mode, and determines the quantity of the plurality of paths based on the max path number information.

For example, the access network device obtains, from a network management device, a max path number corresponding to the multi-path transmission mode. It should be understood that, in this case, the max path number is used without distinguishing between terminal devices, in other words, a same max path number is used for all terminal devices.

For example, an SMF or an AMF sends, to the access network device, the max path number information corresponding to the multi-path transmission mode. Correspondingly, the access network device receives the max path number information, and determines the quantity of the plurality of paths based on the max path number information.

Specifically, in a terminal device registration procedure, the AMF obtains the max path number information of the terminal device from a UDM, and the AMF sends the max path number information of the terminal device to the access network device. The max path number information may be used as subscription information of the terminal device. Alternatively, the max path number information is max path number information of the terminal device obtained by the SMF from a UDM, and is sent to the access network device through the AMF in a session establishment or modification procedure. The max path number information and first indication information may be commonly carried in a same message, or may be respectively carried in different messages. This is not limited in this application.

In some embodiments, the access network device determines the quantity of the plurality of paths based on a QoS parameter of the first QoS flow. A higher QoS parameter requirement of a QoS flow (higher reliability or a higher rate requirement) indicates more paths that are required to perform transmission of the QoS flow. For example, the access network device locally configures or obtains, from a network management device or a core network device, a correspondence between a QoS parameter and a quantity of paths, and the access network device determines the quantity of the plurality of paths based on the correspondence.

In some embodiments, the access network device determines the quantity of the plurality of paths based on the max path number information and the QoS parameter of the first QoS flow. For example, the access network device locally configures or obtains, from the network management device or the core network device, the correspondence between a QoS parameter and a quantity of paths, and the access network device determines the quantity of the plurality of paths based on the correspondence. The quantity of the plurality of paths does not exceed the max path number.

In some embodiments, before step S310, to be specific, before the access network device determines the plurality of paths that are for transmission of the first QoS flow of the terminal device, the method 300 further includes the following step.

Step S309: The access network device determines to use the multi-path transmission mode for the first QoS flow.

The access network device may determine, in the following manner, to use the multi-path transmission mode for the first QoS flow.

Manner 1

In some embodiments, before step S309, the method 300 further includes the following step.

Step S307: A core network element sends the first indication information to the access network device, where the first indication information indicates to use the multi-path transmission mode for transmission of the first QoS flow. Correspondingly, the access network device receives the first indication information, and determines, based on the first indication information, to use the multi-path transmission mode for the first QoS flow.

Specifically, after receiving the first indication information, the access network device determines, based on the first indication information, the plurality of paths that are for transmission of the first QoS flow. The first indication information includes a QoS flow identifier (QFI) corresponding to the first QoS flow, or the access network device receives, in a same message, the first indication information and a QoS flow identifier corresponding to the first QoS flow.

For example, the core network element is an SMF, and the SMF sends, through the AMF, the first indication information to the access network device by using N2 session management information. In addition, the SMF further sends, to the access network device, QoS parameter information, for example, a QoS profile, associated with the first QoS flow. The QoS profile includes a latency, reliability, a rate, a precedence, and the like that are associated with the first QoS flow.

Alternatively, the SMF may further send the first indication information to the terminal device based on a NAS message, and the terminal device receives the first indication information, and sends request information to the SMF or the access network device, to request to use the multi-path transmission mode for transmission of the first QoS flow.

It should be understood that the first indication information may also be considered as request information. To be specific, after receiving the first indication information, the access network device may not execute an operation based on content, namely, that the core network element requests to use the multi-path transmission mode for transmission of the first QoS flow, indicated by the first indication information. The access network device needs to further determine whether to use the multi-path transmission mode for transmission of the first QoS flow. For example, the access network device considers whether the access network device supports a multi-path transmission capability. This is not limited in this application.

In some embodiments, the first indication information further includes a specific form of the multi-path transmission mode, namely, duplication transmission or split transmission.

For example, if the specific form of the multi-path transmission mode is duplication transmission, in an example of a downlink QoS flow, the access network device duplicates a packet of the first QoS flow, and performs transmission of same packets to the terminal device through the plurality of paths, and then the terminal device deduplicates the packets. If the specific form of the multi-path transmission mode is split transmission, in an example of a downlink QoS flow, the access network device performs transmission of different packets of the first QoS flow to the terminal device through different paths.

Manner 2

In some embodiments, the access network device can determine, based on authorization information, to use the multi-path transmission mode for first QoS flow, where the authorization information indicates that the terminal device is authorized to serve as the remote terminal device or is authorized to use the multi-path transmission mode. That the terminal device is authorized to serve as the remote terminal device may also be: The terminal device is authorized to access a network through a relay terminal device. Specifically, in a registration procedure of the terminal device, the access network device receives the authorization information from the AMF.

For example, if the authorization information indicates that the terminal device is authorized to serve as the remote terminal device or is authorized to use the multi-path transmission mode, the access network device determines to use the multi-path transmission mode for the first QoS flow. If the authorization information indicates that the terminal device is not authorized to serve as the remote terminal device or is not authorized to use the multi-path transmission mode, the access network device determines that the multi-path transmission mode cannot be used for the first QoS flow. If the access network device does not receive the authorization information from the AMF, the access network device determines that the multi-path transmission mode cannot be used for the first QoS flow.

Manner 3

In some embodiments, when the access network device has preconfiguration information locally, the access network device may determine, based on the preconfiguration information and the QoS parameter that is of the first QoS flow and that is obtained from the SMF, to use the multi-path transmission mode for the first QoS flow.

For example, the RAN may determine, based on the local preconfiguration information and 5G QoS identifier (5QI) information that is in information about the QoS parameter, to use the multi-path transmission mode for the first QoS flow. The local preconfiguration information includes 5QI information, where the multi-path transmission mode needs to be used for a QoS flow corresponding to the 5QI information (where a 5QI is an index value of a QoS parameter, and each 5QI value corresponds to one set of QoS parameters).

Manner 4

In some embodiments, after receiving the first indication information from a core network element, the access network device determines, based on the first indication information and authorization information, to use the multi-path transmission mode for transmission of the first QoS flow.

For example, after receiving the first indication information from the core network element, the access network device further determines, based on the authorization information, to use the multi-path transmission mode for transmission of the first QoS flow.

Manner 5

In some embodiments, when the QoS parameter of the first QoS flow is not fulfilled (QoS parameter is not fulfilled), the access network device determines to use the multi-path transmission mode for the first QoS flow.

For example, when the access network device determines that the QoS parameter of the first QoS flow is not fulfilled, the access network device determines to use the multi-path transmission mode for the first QoS flow, to attempt to fulfill the QoS parameter of the first QoS flow.

In some embodiments, the access network device may further determine a specific form of the multi-path transmission mode. The specific form of the multi-path transmission mode may be duplication transmission or split transmission.

For example, if a packet error rate (PER) in the QoS parameter is not fulfilled, a specific form of the multi-path transmission mode may be duplication transmission: In an example of a downlink QoS flow, the access network device duplicates a packet of the first QoS flow, and performs transmission of same packets to the terminal device through a plurality of paths, and then the terminal device deduplicates the packets. That a packet error rate in the QoS parameter is not fulfilled may be understood as: An actual packet error rate in transmission of the first QoS flow by the access network device is higher than the packet error rate that is in the QoS parameter. For another example, if a guaranteed flow bit rate (GFBR) in the QoS parameter is not fulfilled, a specific form of the multi-path transmission mode may be split transmission: In an example of a downlink QoS flow, the access network device performs transmission of different packets of the first QoS flow to the terminal device through different paths. That a guaranteed flow bit rate in the QoS parameter is not fulfilled may be understood as: An actual flow bit rate in transmission of the first QoS flow by the access network device is less than the guaranteed flow bit rate that is in the QoS parameter.

Manner 6

In some embodiments, when the QoS parameter of the first QoS flow is not fulfilled, the access network device may further determine, based on authorization information, to use the multi-path transmission mode for the first QoS flow.

Manner 7

In some embodiments, the access network device may further receive configuration information from the SMF. The configuration information may be that the multi-path transmission mode needs to be used for the first QoS flow when the QoS parameter of the first QoS flow is not fulfilled. When determining that the QoS parameter of the first QoS flow is not fulfilled, the access network device may further determine, based on the configuration information, to use the multi-path transmission mode for the first QoS flow.

Manner 8

In some embodiments, before step S309, the method 300 further includes the following step.

Step S308: The terminal device sends request information to the access network device, where the request information requests to use the multi-path transmission mode for transmission of the first QoS flow. Correspondingly, the access network device receives the request information, and determines, based on the request information, to use the multi-path transmission mode for the first QoS flow. For example, the terminal device may send the request information to the access network device through an RRC reconfiguration message.

Specifically, after receiving the request information, the access network device determines, based on the request information, to use the multi-path transmission mode for the first QoS flow. Alternatively, after receiving the request information, the access network device determines, based on the request information and authorization information, to use the multi-path transmission mode for the first QoS flow, where the authorization information indicates that the terminal device is authorized to serve as the remote terminal device or is authorized to use the multi-path transmission mode.

It should be understood that the foregoing different manners are parallel solutions, and the access network device may further determine, in the foregoing one or more manners, to use the multi-path transmission mode for the first QoS flow. This is not limited in this application.

The following describes how the access network device determines a multi-path transmission preference, in other words, the access network device determines that the multi-path transmission mode includes a multi-path transmission mode that is performed through a relay terminal device.

In some embodiments, in step 307, the access network device receives the first indication information. In addition to indicating that the multi-path transmission mode is used for transmission of the first QoS flow, the first indication information may further include a field indicating that the multi-path transmission mode includes the multi-path transmission mode that is performed through the relay terminal device, that is, the field indicates a preference of the multi-path transmission mode (where for example, the field may be relay link prefer, indicating a preference of the multi-path transmission mode that is performed through the relay terminal device).

Alternatively, the first indication information directly indicates that the multi-path transmission mode that is performed through the relay terminal device is used for transmission of the first QoS flow. The multi-path transmission mode that is performed through the relay terminal device may be understood as that an indirect path in the plurality of paths is an indirect path that is between the access network device and the terminal device and that passes through the relay terminal device, in other words, the indirect path in the plurality of paths is not an indirect path that is between the access network device and the terminal device and that passes through a secondary node. Therefore, after receiving the first indication information, the access network device may determine a type of the multi-path transmission mode, for example, including an indirect transmission mode that is performed through the relay terminal device and a direct transmission mode, and do not select an indirect transmission mode in which dual connectivity is used (where a field indicating the indirect transmission mode in which dual connectivity is preferred may be DC prefer).

In some embodiments, that the access network device determines to use the multi-path transmission mode for transmission of the first QoS flow may further include: The access network device determines to use, for transmission of the first QoS flow, the multi-path transmission mode that is performed through the relay terminal device.

For example, the access network device determines, based on a capability of the access network device, to use, for the first QoS flow, the multi-path transmission mode that is performed through the relay terminal device. The capability of the access network device may be that a protocol stack of the access network device supports an adaptation layer, or the access network device supports layer-2 relay transmission, or the access network device has been connected to a layer-2 relay.

For example, the access network device determines, based on that the remote terminal device cannot perform DC, to use, for the first QoS flow, the multi-path transmission mode that is performed through the relay terminal device. Specifically, the access network device may determine, based on a remote terminal device radio capability obtained from the remote terminal device or the AMF or a connection relationship of the access network device, that the terminal device cannot perform DC. The connection relationship of the access network device is whether the access network device is directly connected to another access network device or whether the access network device can be a master node to connect to another secondary node. Step S320: The access network device performs transmission of the first QoS flow through the plurality of paths.

In some embodiments, the access network device establishes a dedicated data radio bearer (DRB) for the first QoS flow, and the access network device performs transmission of the first QoS flow on the data radio bearer through the plurality of paths. Specifically, in an example of the downlink QoS flow, after receiving data of the first QoS flow from a UPF, the access network device maps the data of the first QoS flow to the data radio bearer, and sends the data of the data radio bearer to the terminal device through the plurality of paths (including a direct path and an indirect path). The terminal device receives the data of the data radio bearer through the plurality of paths, eliminates duplicate data, and submits data to an application layer.

It should be understood that the dedicated data radio bearer means that the first QoS flow has a dedicated data radio bearer, and the data radio bearer is not shared with another QoS flow.

In some embodiments, the method 300 further includes the following step.

Step S330: When the QoS parameter of the first QoS flow of which transmission is performed through the plurality of paths is not fulfilled, the access network device sends first information to the core network element. Correspondingly, the core network element receives the first information.

The first information indicates that the QoS parameter of the first QoS flow is not fulfilled.

Alternatively, the first information indicates that the QoS parameter of the first QoS flow is not fulfilled when the multi-path transmission mode is used for the first QoS flow. In this case, the first information includes two fields. A first field indicates that the QoS parameter of the first QoS flow is not fulfilled, and the second field indicates that a transmission mode used for the first QoS flow is the multi-path transmission mode. Alternatively, the first information includes one field, and the field indicates that the QoS parameter of the first QoS flow is not fulfilled when the multi-path transmission mode is used for the first QoS flow.

For example, the access network device sends the first information to the core network element SMF through the AMF, where the first information is used to notify the SMF that the QoS parameter of the first QoS flow is not fulfilled in a case of multi-path transmission. In this way, after receiving the first information, the SMF does not need to trigger the access network device to establish the plurality of paths for transmission of the first QoS flow, and after receiving the first information, the SMF notifies the terminal device of a change of the QoS parameter of the first QoS flow.

It should be understood that the first information is sent when the access network device uses the multi-path transmission mode for transmission of the first QoS flow and when the QoS parameter of the first QoS flow is not fulfilled.

In the foregoing descriptions of step S310, Case 2 (to be specific, the another path includes the indirect path) in Manner 1 (to be specific, the access network device establishes the plurality of paths that are for transmission of the first QoS flow of the terminal device) means that the access network device establishes the indirect path that is for transmission of the first QoS flow of the terminal device. It should be understood that information about the relay terminal device needs to be obtained before the indirect path is established.

Figure 6:
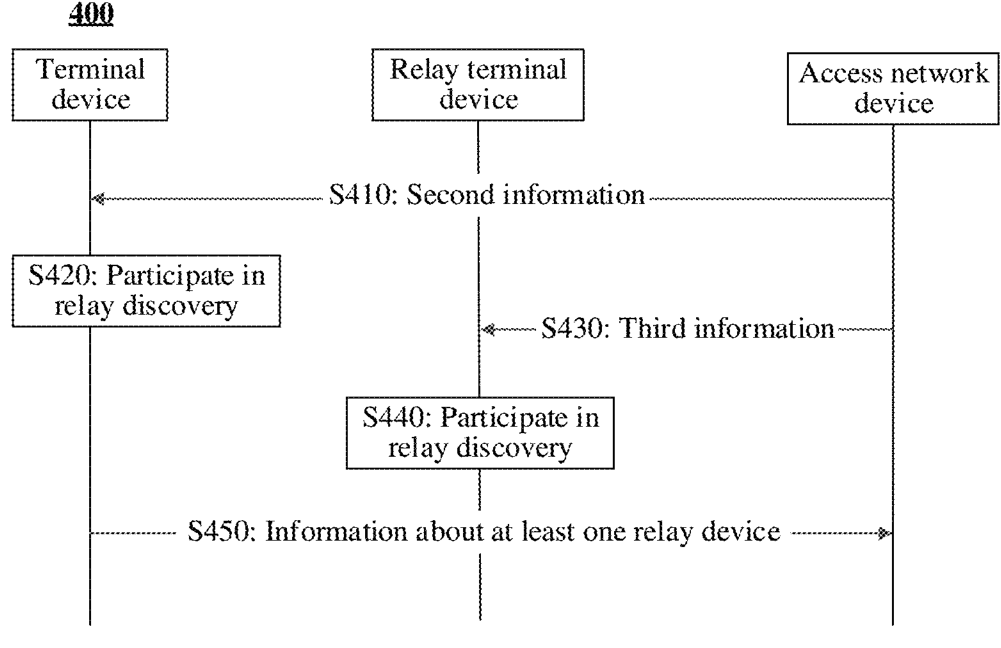
FIG. 6 is a schematic flowchart in which an access network device obtains information about a relay terminal device according to an embodiment of this application.

The following describes a method 400 in which an access network device obtains information about a relay terminal device. The method 400 shown in FIG. 6 includes the following step.

Step S410: The access network device sends second information to a terminal device, where the second information is for triggering the terminal device to report the information about the relay terminal device. Correspondingly, the terminal device receives the second information.

For example, the access network device sends an RRC message to a remote terminal device, where the RRC message includes the second information, and the RRC message is for requesting the remote terminal device to report a measurement report or report a relay terminal device list (Relay UE list). In addition, the access network device may further indicate, through the RRC message, that the relay terminal device list is for establishing multi-path transmission, or the access network device may further indicate, through the RRC message, to discover and measure only a relay terminal device that is in a same cell. In this way, the remote terminal device discovers and reports information about only a relay terminal device whose cell identity (Cell ID) is the same as that of a cell serving the remote terminal device.

In some embodiments, the second information may further include indication information for sending or receiving a relay discovery message, or the second information may further include information about a discovery mode A (where the discovery mode A is that the terminal device receives the relay discovery message) or a discovery mode B (where the discovery mode B is that the terminal device sends the relay discovery message). In this way, after receiving the second information, the terminal device participates in relay discovery by using the discovery mode A or B, or sends or receives the relay discovery message. Specifically, the access network device determines the second information based on other information obtained from the terminal device or an AMF. The terminal device may actively report, to a RAN, that the terminal device tends to send or receive the discovery message (or the discovery mode B or A), or the RAN obtains, from the AMF, information indicating whether the terminal device is authorized to serve as a receiving terminal device or a sending terminal device.

In some embodiments, the method 400 further includes the following steps.

Step S420: After the terminal device receives the second information, the terminal device participates in relay discovery.

For example, after receiving the second information, the terminal device participates in a relay discovery procedure, and the second information is used as a trigger condition for the terminal device to participate in relay discovery. It should be understood that before the terminal device receives the second information, the terminal device does not participate in relay discovery, to be specific, the terminal device does not actively send the relay discovery message (where the sending corresponds to the discovery mode B) or receive the relay discovery message (where the receiving corresponds to the discovery mode A). That the terminal device participates in the relay discovery procedure may include: The terminal device actively sends the relay discovery message (where the sending corresponds to the discovery mode B), or receives the relay discovery message (where the receiving corresponds to the discovery mode A). It should be understood that, when the terminal device receives the second information, the remote terminal device may ignore a configuration rule (in which the discovery procedure can be started only when signal quality of an air interface signal is lower than a threshold, which is the same as step S220) sent by the access network device.

In the relay discovery procedure, the relay discovery message actively sent by the remote terminal device may further include a cell ID. The cell ID is used to discover only a relay terminal device that camps on a cell (a cell that provides a service for the remote terminal device) identified by the cell ID, so that a relay terminal device that receives the discovery message determines whether an identifier of a cell on which the relay terminal device camps is the same as the cell ID, and feeds back a response message only if the identifier is the same as the cell ID. The relay discovery message received by the terminal device includes the cell ID of the cell on which the relay terminal device camps, and the terminal device determines whether an identifier of a cell on which the terminal device camps is the same as the cell ID, and feeds back a response message or establishes a connection to the relay terminal device only if the identifier is the same as the cell ID.

In some embodiments, when the second information further includes indication information for sending or receiving the relay discovery message, or information about the discovery mode B or the discovery mode A, the terminal device participates in relay discovery by using the discovery mode A or B, or the terminal device sends or receives the discovery message.

Step S450: The terminal device sends information about at least one relay terminal device to the access network device. Correspondingly, the access network device receives the information about the at least one relay terminal device.

For example, the information about the at least one relay terminal device may be carried in a measurement report sent by the terminal device to the access network device. The information about the relay terminal device includes identification information of the relay terminal device, for example, a cell radio network temporary identifier (C-RNTI). The information about the relay terminal device may further include a cell ID of a cell on which the relay terminal device camps.

The information about the relay terminal device may further include information about quality of a signal between the relay terminal device and the access network device and/or information about quality of a signal between the relay terminal device and the remote terminal device, where the information about the signal quality may be reference signal received power (RSRP) or reference signal received quality (RSRQ).

After receiving the information about the at least one relay terminal device, the access network device may establish at least one indirect path in the plurality of paths based on the information about the at least one relay terminal device.

In some embodiments, the access network device determines, based on the information about the at least one relay terminal device, a relay terminal device that is for establishing an indirect path, and then the access network device establishes the indirect path through the selected relay terminal device. For example, the access network device receives information about 10 relay terminal devices, and selects one or more relay terminal devices from the 10 relay terminal devices. Specifically, the access network device may select a relay terminal device based on information about quality of a signal between each relay terminal device and the access network device and/or information about quality of a signal between each relay terminal device and the terminal device. For example, when quality of a signal between a relay terminal device and the access network device is lower than a specified threshold, the access network device does not select the relay terminal device. For another example, when quality of a signal between a relay terminal device and the access network device is higher than a specified threshold or quality of a signal between the remote UE and a relay terminal device is higher than a specified threshold, the access network device selects the relay terminal device.

In some embodiments, before step S450, the method 400 further includes the following steps.

Step S430: The access network device sends third information to the at least one relay terminal device, where the third information is for triggering the at least one relay terminal device to participate in relay discovery, and correspondingly, the at least one relay terminal device receives the third information.

For example, the access network device sends the third information to the at least one relay terminal device. The at least one relay terminal device includes a relay terminal device 1 and a relay terminal device 2. After receiving the third information, the relay terminal device 1 and the relay terminal device 2 separately participate in relay discovery. It is assumed that the information list of the relay terminal device sent by the terminal device to the access network device includes the information, about the 10 relay terminal devices, including information about the relay terminal device 1 and information about the relay terminal device 2. If the plurality of paths determined by the access network device are three paths that include two indirect paths and one direct path, the two indirect paths are indirect paths that pass through the relay terminal device 1 and the relay terminal device 2.

For example, the access network device may send the third information in a unicast manner or a broadcast manner, to activate the relay terminal device to participate in relay discovery. When the third information is sent in the unicast manner, the access network device may send an RRC message to the relay terminal device based on authorization information (indicating whether the relay terminal device is authorized to serve as a relay terminal device, where the authorization information is obtained by the AMF from a UDM and sent to the access network device in a registration process of the relay terminal device) of the relay terminal device, where the RRC message includes the third information, namely, a relay discovery activation indication. When the third information is sent in the broadcast manner, the third information is carried in a system information block (SIB) message.

In some embodiments, the third information may further include indication information for sending or receiving the relay discovery message, or the third information may further include information about the discovery mode A or the discovery mode B. In this way, after receiving the third information, the relay terminal device participates in relay discovery by using the discovery mode A or B, or sends or receives the relay discovery message.

Specifically, the access network device determines the third information based on other information obtained from the relay terminal device or the AMF. The relay terminal device may actively report, to the access network device, that the relay terminal device tends to send or receive the discovery message (or the discovery mode A or B), or the access network device obtains, from the AMF, information indicating whether the relay terminal device is authorized to serve as a receiving terminal device or a sending terminal device.

Step S440: After receiving the third information, the relay terminal device participates in relay discovery.

For example, the relay terminal device receives the third information, and the third information is used as a trigger condition for the relay terminal device to participate in relay discovery. It should be understood that before the relay terminal device receives the third information, the relay terminal device does not participate in relay discovery, to be specific, the relay terminal device does not actively send the relay discovery message (where the sending corresponds to the discovery mode A) or receive the relay discovery message (where the receiving corresponds to the discovery mode B). That the relay terminal device participates in the relay discovery procedure may include: The relay terminal device actively sends the relay discovery message (where the sending corresponds to the discovery mode A), or the relay terminal device receives the relay discovery message (where the receiving corresponds to the discovery mode B).

It should be understood that, when the relay terminal device receives the second information, the relay terminal device may ignore the configuration rule (in which the relay terminal device can participate in the discovery procedure only when the air interface signal meets a specific condition) sent by the access network device. In the relay discovery procedure, the relay discovery message actively sent by the relay terminal device may further include the cell ID, and the cell ID indicates an identifier of the cell on which the relay terminal device camps. The relay discovery message received by the relay terminal device includes a cell ID of a cell on which the remote terminal device camps, and the relay terminal device determines whether the identifier of the cell on which the relay terminal device camps is the same as the cell ID, and feeds back a response message or establishes a connection to the remote terminal device only if the identifier is the same as the cell ID.

In some embodiments, the third information may further include the indication information for sending or receiving the relay discovery message, or the third information may further include the information about the discovery mode A or the discovery mode B. The relay terminal device sends or receives the relay discovery message when determining, based on the third information, to participate in relay discovery.

Figure 7:
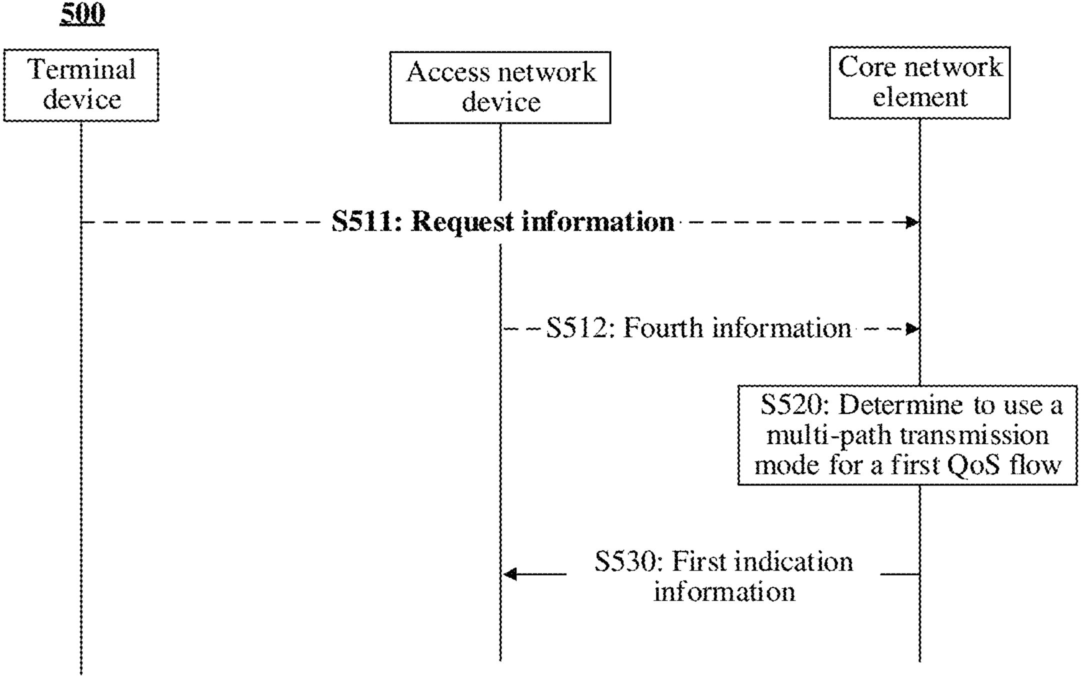
FIG. 7 is a schematic flowchart in which a core network element determines to use a multi-path transmission mode according to an embodiment of this application.

The following describes a method 500 in which a core network element determines to use a multi-path transmission mode to perform transmission of a first QoS flow, so that after determining to use the multi-path transmission mode, the core network element sends first indication information to an access network device. It should be understood that the method 500 may be considered as a trigger condition of step S307 in the method 300, and an SMF is used as an example of the core network element in the method 500. The method 500 shown in FIG. 7 includes the following steps.

Step S520: The core network element determines to use the multi-path transmission mode for the first QoS flow of a terminal device, where the multi-path transmission mode is a transmission mode including at least two paths that are in a first path set, the first path set includes N indirect paths and a direct path between the access network device and the terminal device, the N indirect paths include indirect paths that are between the access network device and the terminal device and that pass through N relay terminal devices, and N is an integer greater than or equal to 1.

The core network element may determine to use the multi-path transmission mode for the first QoS flow in the following manners.

Manner 1

The core network element may determine, based on authorization information, to use the multi-path transmission mode for the first QoS flow. The authorization information indicates that the terminal device is authorized to serve as a remote terminal device or is authorized to use the multi-path transmission mode. If the authorization information indicates that the terminal device is not authorized to serve as a remote terminal device or is not authorized to use the multi-path transmission mode, the core network element determines that the multi-path transmission mode cannot be used for the first QoS flow.

For example, the core network element SMF may obtain the authorization information from a PCF or a UDM.

Alternatively, the SMF may further determine, based on authorized 5QI information obtained from the PCF, to use the multi-path transmission mode for the first QoS flow. For example, the SMF may locally configure 5QI information, where the multi-path transmission mode needs to be used for a QoS flow corresponding to the 5QI.

Alternatively, the SMF may further obtain, through an AMF, a capability (for example, whether the access network device supports redundant transmission performed through a layer-2 relay) of the access network device, and determine, based on the authorization information and the capability of the access network device, to use the multi-path transmission mode for the first QoS flow. For example, only when the authorization information indicates that the terminal device is authorized to serve as a remote terminal device or is authorized to use the multi-path transmission mode, and the capability of the access network device is that the redundant transmission performed through the layer-2 relay is supported, the SMF determines to use the multi-path transmission mode for the first QoS flow.

Manner 2

In some embodiments, the method 500 further includes the following step.

Step S511: The terminal device sends request information to the core network element, where the request information requests to use the multi-path transmission mode for transmission of a first data flow. Correspondingly, the core network element receives the request information.

The core network element may determine, based on the request information, to use the multi-path transmission mode for the first QoS flow.

In some embodiments, in step S511, the terminal device sends a NAS message to an AMF, where the NAS message includes the request information, and then the AMF forwards the request information to the SMF.

When the first data flow is the first QoS flow, the core network element may determine, based on the request information, to use the multi-path transmission mode for the first QoS flow.

When the first data flow is a first service flow, the core network element allocates the first QoS flow to the first service flow, and then determines to use the multi-path transmission mode for the first QoS flow.

Manner 3

In some embodiments, the method 500 further includes the following step.

Step S512: The access network device sends fourth information to the core network element, where the fourth information indicates that a QoS parameter of the first QoS flow is not fulfilled. Correspondingly, the core network element receives the fourth information, and determines, based on the fourth information, to use the multi-path transmission mode for the first QoS flow.

The core network element may determine, based on the fourth information, to use the multi-path transmission mode for the first QoS flow.

In some embodiments, in step S512, the access network device sends the fourth information to the core network element SMF through an AMF, where the fourth information may be included in N2 session management information (N2 SM information).

It should be understood that the core network element may further determine, in the foregoing manners, to use the multi-path transmission mode for the first QoS flow. For example, the core network element determines, based on Manner 1 and Manner 2, to use the multi-path transmission mode for the first QoS flow, or the core network element determines, based on Manner 1 and Manner 3, to use the multi-path transmission mode for the first QoS flow, or the core network element determines, based on Manner 2 and Manner 3, to use the multi-path transmission mode for the first QoS flow, or the core network element determines, based on Manner 1, Manner 2, and Manner 3, to use the multi-path transmission mode for the first QoS flow. This is not limited in this application.

Step S530 corresponds to step S307 in FIG. 3.

In some embodiments, in step S520, the core network element may further determine a specific form of the multi-path transmission mode, namely, duplication transmission or split transmission. Correspondingly, the first indication information in step S530 further includes the specific form of the multi-path transmission mode.

For example, if a packet error rate in the QoS parameter of the first QoS flow is not fulfilled, the specific form of the multi-path transmission mode may be duplication transmission. That a packet error rate in the QoS parameter is not fulfilled may be understood as: An actual packet error rate in transmission of the first QoS flow by the access network device is higher than the packet error rate that is in the QoS parameter. For another example, if a requirement on a guaranteed flow bit rate in the QoS parameter of the first QoS flow is high, or a guaranteed flow bit rate in the fourth information received by the core network element is not fulfilled, the specific form of the multi-path transmission mode may be split transmission. That a guaranteed flow bit rate in the QoS parameter is not fulfilled may be understood as: An actual flow bit rate in transmission of the first QoS flow by the access network device is less than the guaranteed flow bit rate that is in the QoS parameter.

The following describes a method 600 in which a terminal device determines to use a multi-path transmission mode to perform transmission of a first QoS flow, so that after determining to use the multi-path transmission mode, the terminal device sends request information to an access network device or a core network element. It should be understood that the method 600 may be considered as a trigger condition of step S308 in the method 300. The method 600 shown in FIG. 8 includes the following steps.

Step S630: The terminal device determines to use the multi-path transmission mode for a first data flow.

The terminal device may determine, in the following manner, to use the multi-path transmission mode for the first data flow.

Manner 1

Step S610: The core network element sends second indication information to the terminal device, where the second indication information indicates to use the multi-path transmission mode for the first data flow. Correspondingly, the terminal device receives the second indication information, and determines to use the multi-path transmission mode for the first data flow. For example, the core network element may be a PCF, and the first data flow is a first service flow. In a registration procedure or a policy update procedure of the terminal device, the PCF sends the second indication information to the terminal device through an AMF, where the second indication information indicates to use the multi-path transmission mode for the first data flow. The first data flow may be represented as a traffic descriptor, and may be specifically an application identifier, an application descriptor, or an IP descriptor. The IP descriptor may be in a form of an IP triplet (an IP address, a port number, and a protocol identifier). Alternatively, the PCF may send the second indication information to an SMF, and in a PDU session establishment or modification procedure, the SMF sends the second indication information to the terminal device through the AMF.

In some embodiments, the PCF sends a policy (the second indication information) to the terminal device based on authorization information, to indicate, to the terminal device, an application for which the multi-path transmission mode can be used. The policy is in a route selection policy of the terminal device (UE route selection policy, URSP), or is in policy information independently used for ProSe communication.

When initiating a service, the terminal device determines, based on the policy information, that the multi-path transmission mode may be used for the first data flow. Therefore, in step S640, the terminal device sends request information to the SMF to request to establish multi-path transmission for the first data flow (the first service flow or the first QoS flow). The request information may be a redundant transmission request or a multi-path transmission request. This is not limited in this application. The request information may further include a packet filter corresponding to the data flow, a requested QoS parameter, and a segregation indication. The segregation indication indicates that a separate QoS flow needs to be established for the data flow, and the QoS flow is not shared with another service.

Alternatively, when initiating a service, the terminal device determines, based on the policy information, that the multi-path transmission mode may be used for the first data flow, and requests the SMF to establish a separate QoS flow for the first data flow (the first QoS flow). Then, in step S650, the terminal device requests the access network device to establish a plurality of paths for transmission of the first QoS flow.

Manner 2

Step S620: The core network element sends fourth information to the terminal device, where the fourth information indicates that a QoS parameter of the first QoS flow is not fulfilled. Correspondingly, the terminal device receives the fourth information, determines, based on the fourth information, to use the multi-path transmission mode for the first QoS flow, and further performs step S640 or step S650.

For example, the core network element may be an SMF. For the terminal device, the fourth information is used as a condition for triggering to use the multi-path transmission mode for the first QoS flow. In some embodiments, after receiving the fourth information, the terminal device further needs to determine authorization information. If the authorization information indicates that the terminal device is authorized to serve as a remote terminal device or is authorized to use the multi-path transmission mode, the terminal device determines to use the multi-path transmission mode for the first QoS flow. If the authorization information indicates that the terminal device is not authorized to serve as a remote terminal device or is not authorized to use the multi-path transmission mode, the terminal device determines that the multi-path transmission mode cannot be used for the first QoS flow.

It should be understood that before step S620, the core network element SMF obtains the fourth information in step S512. Step S640 corresponds to step S511 shown in FIG. 7, and step S650 corresponds to step S308 shown in FIG. 5.

It should be understood that the terminal device may further determine, in the foregoing manners, to use the multi-path transmission mode for the first QoS flow. For example, the terminal device determines, based on Manner 1 and Manner 2, to use the multi-path transmission mode for the first QoS flow. This is not limited in this application.

In this application, a direct path may be understood as a direct network communication path, and an indirect path may be understood as an indirect network communication path.

FIG. 9 is another schematic flowchart of using a multi-path transmission mode according to an embodiment of this application. A method 700 shown in FIG. 9 includes the following steps.

S710: A terminal device determines to use the multi-path transmission mode for transmission of a first data flow, where the multi-path transmission mode is a mode of transmission through at least two paths.

The first data flow may be represented as a traffic descriptor, and may be specifically an application identifier, an application descriptor, or an IP descriptor.

It should be noted that the determining to use the multi-path transmission mode for transmission of the first data flow in step S710 and a plurality of implementations of step S710 may be replaced with or includes: determining to use, for transmission of the first data flow, a multi-path transmission mode including a layer-3 relay indirect network communication path.

The multi-path transmission mode including the layer-3 relay indirect path may be understood as a mode of transmission through at least two paths, and the at least two paths include the layer-3 relay indirect network communication path.

The layer-3 relay indirect network communication path may be understood as an indirect network communication path through which the terminal device accesses a network through a layer-3 relay terminal device, or an indirect network communication path that is between the terminal device and a network device and that passes through a layer-3 relay terminal device. The network device may be an access network device or a core network device.

Specifically, step S710 may be implemented by using the following plurality of implementations.

Manner 1

The terminal device determines, based on a URSP policy or a proximity-based service ProSe policy of the terminal device, to use, for transmission of the first data flow, the multi-path transmission mode including the layer-3 relay indirect network communication path.

If the URSP policy or the ProSe policy indicates to use, for the first data flow, multi-path transmission including the layer-3 relay indirect network communication path, it indicates that the terminal device needs to use multi-path transmission for the first data flow, and an indirect network communication path in a plurality of paths for performing transmission of the first data flow is the layer-3 relay indirect network communication path. Alternatively, the URSP policy or the ProSe policy may indicate to use, for the first data flow, multi-path transmission including a direct network communication path and the layer-3 relay indirect network communication path, in other words, it indicates that the terminal device needs to use multi-path transmission for the first data flow, and a plurality of paths for performing transmission of the first data flow include the direct network communication path and the layer-3 relay indirect network communication path. Further, the terminal device determines, based on the URSP policy or the ProSe policy of the terminal device, to use, for transmission of the first data flow, the multi-path transmission mode including the layer-3 relay indirect network communication path.

For example, the URSP policy or the ProSe policy includes a correspondence between a first data flow and a route selection descriptor (RSD), the RSD includes third indication information, and the third indication information indicates to use multi-path transmission for the first data flow or indicates to use, for the first data flow, the multi-path transmission including the layer-3 relay indirect network communication path. Further, the terminal device determines, based on the URSP policy or the ProSe policy of the terminal device, to use, for transmission of the first data flow, the multi-path transmission mode including the layer-3 relay indirect network communication path.

For example, if the URSP policy or the ProSe policy indicates to use multi-path transmission for the first data flow, it indicates that the terminal device needs to use multi-path transmission for the first data flow. Further, the terminal device determines, based on the URSP policy or the ProSe policy of the terminal device, to use the multi-path transmission mode for transmission of the first data flow.

For example, the URSP policy or the ProSe policy indicates to use multi-path transmission for the first data flow, in other words, indicates that the terminal device needs to use multi-path transmission for the first data flow, and a transmission precedence of using the multi-path transmission mode including the layer-3 relay indirect network communication path is higher than that of using a multi-path transmission mode including a layer-2 relay indirect network communication path. Further, the terminal device determines, based on the URSP policy or the ProSe policy of the terminal device, to use, for transmission of the first data flow, the multi-path transmission mode including the layer-3 relay indirect network communication path.

For example, the URSP policy or the ProSe policy includes the correspondence between a first data flow and a route selection descriptor (RSD), the RSD includes the third indication information, and the third indication information indicates to use multi-path transmission for the first data flow. Further, the terminal device determines, based on the URSP policy or the ProSe policy of the terminal device, to use the multi-path transmission mode for transmission of the first data flow.

For example, the URSP policy or the ProSe policy includes a correspondence between a first data flow and a first RSD and a correspondence between a first data flow and a second RSD. The first RSD includes third indication information, and the third indication information indicates to use, for the first data flow, multi-path transmission including the layer-3 relay indirect network communication path. The second RSD includes fourth indication information, and the fourth indication information indicates to use, for the first data flow, multi-path transmission including the layer-2 relay indirect network communication path. A precedence of the first RSD is higher than that of the second RSD. Further, the terminal device determines, based on the URSP policy or the ProSe policy of the terminal device, to use, for transmission of the first data flow, the multi-path transmission mode including the layer-3 relay indirect network communication path.

Manner 2

The terminal device receives third indication information.

The third indication information may indicate to use the multi-path transmission mode for the first data flow, or the third indication information may indicate to use, for the first data flow, the multi-path transmission mode including the layer-3 relay indirect network communication path. That the third indication information may indicate to use, for the first data flow, the multi-path transmission mode including the layer-3 relay indirect network communication path may also be expressed in the following manner: The third indication information may indicate to use the multi-path transmission mode for the first data flow, and the at least two paths in the multi-path transmission mode include the layer-3 relay indirect network communication path.

Alternatively, the third indication information may indicate to use the multi-path transmission mode, or the third indication information may indicate to use the multi-path transmission mode including the layer-3 relay indirect network communication path. That the third indication information may indicate to use the multi-path transmission mode including the layer-3 relay indirect network communication path may also be expressed in the following manner: The third indication information may indicate to use the multi-path transmission mode, and the at least two paths in the multi-path transmission mode include the layer-3 relay indirect network communication path.

It should be noted that when step S710 is implemented in Manner 2, step S720 may include: The terminal device performs transmission of, based on the third indication information, the first data flow through at least two paths that are in a second path set. The at least two paths in the second path set may include an indirect network communication path, and the indirect network communication path is the layer-3 relay indirect network communication path on which the terminal device accesses the network through a first relay terminal device. The first relay terminal device may be a layer-3 relay terminal device.

It should be noted that step S710 may be replaced with a step in which the terminal device receives the third indication information. This is not limited. In a solution in which S710 is replaced with the step in which the terminal device receives the third indication information, a terminal device end may not determine to use the multi-path transmission mode for transmission of the first data flow, to be specific, after receiving the third indication information, in S720, the terminal device may directly perform, based on the third indication information, transmission of the first data flow through the at least two paths that are in the second path set.

In addition, the third indication information may be carried in the URSP policy of the terminal device or the ProSe policy of the terminal device. Further, that the terminal device receives the third indication information may include: The terminal device receives the URSP policy of the terminal device or the ProSe policy of the terminal device. For example, the terminal device obtains the URSP policy (a locally preconfigured URSP policy, or a URSP policy received from the PCF) of the terminal device. The URSP policy of the terminal device indicates to use the multi-path transmission mode for transmission of the first data flow, or indicates to use, for transmission of the first data flow, the multi-path transmission mode including the layer-3 relay indirect network communication path.

For example, the terminal device obtains the ProSe policy (a locally preconfigured ProSe policy, or a ProSe policy received from the PCF) of the terminal device. The ProSe policy of the terminal device indicates to use the multi-path transmission mode for transmission of the first data flow, or indicates to use, for transmission of the first data flow, the multi-path transmission mode including the layer-3 relay indirect network communication path.

For example, UE #1 obtains the ProSe policy from the PCF (a PCF selected by the AMF for the UE #1 when the UE #1 is registered), where the ProSe policy includes third indication information, and the third indication information indicates whether multi-path transmission can be used for the first data flow or whether multi-path transmission including the layer-3 relay indirect network communication path can be used for the first data flow. Before performing transmission of the first data flow, the UE #1 may determine, based on the ProSe policy, whether to use, for transmission of the first data flow, the multi-path transmission mode or the multi-path transmission mode including the layer-3 relay indirect network communication path. If the third indication information indicates that the multi-path transmission mode or the multi-path transmission mode including the layer-3 relay indirect network communication path may be used for transmission of the first data flow, the UE #1 determines to use, for transmission of the first data flow, the multi-path transmission mode or the multi-path transmission mode including the layer-3 relay indirect network communication path.

For example, the UE #1 obtains the URSP from the PCF (the PCF selected by the AMF for the UE #1 when the UE #1 is registered), where the URSP includes a correspondence between a first data flow and a route selection descriptor (RSD), the RSD includes the third indication information, the third indication information indicates to use multi-path transmission for the first data flow or indicates to use, for the first data flow, multi-path transmission including the layer-3 relay indirect network communication path, and the third indication information is, for example, Multi-Path with Layer 3 UE-to-Network Relay indication. That is, the RSD corresponding to the first data flow includes the Multi-Path with Layer 3 UE-to-Network Relay indication. Before performing transmission of the first data flow, the UE #1 may determine, based on the correspondence between a first data flow and a RSD, whether to use, for transmission of the first data flow, the multi-path transmission mode or the multi-path transmission mode including the layer-3 relay indirect network communication path. If the RSD corresponding to the first data flow includes the third indication information (namely, the Multi-Path with Layer 3 UE-to-Network Relay indication), the UE #1 determines to use, for transmission of the first data flow, the multi-path transmission mode or the multi-path transmission mode including the layer-3 relay indirect network communication path.

For another example, the UE #1 obtains the URSP from the PCF (the PCF selected by the AMF for the UE #1 when the UE #1 is registered), where the URSP includes a correspondence between a first data flow and a RSD, the RSD includes third indication information, the third indication information indicates to use, for the first data flow, multi-path transmission including the layer-3 relay indirect network communication path, and the third indication information is, for example, ProSe Layer-3 UE-to-Network Relay offload indication and multi-path preference. The multi-path preference may be replaced with a multi-path indication. In other words, the RSD corresponding to the first data flow includes the ProSe Layer-3 UE-to-Network Relay offload indication and the multi-path preference. It should be understood that if the RSD corresponding to the first data flow includes only the ProSe Layer-3 UE-to-Network Relay offload indication, the UE #1 uses the layer-3 relay indirect network communication path for transmission of the first data flow; or if the RSD corresponding to the first data flow includes the ProSe Layer-3 UE-to-Network Relay offload indication and the multi-path preference, the UE #1 uses, for transmission of the first data flow, a plurality of paths including the layer-3 relay indirect network communication path. Before performing transmission of the first data flow, the UE #1 may determine, based on the correspondence between a first data flow and a RSD, whether to use, for transmission of the first data flow, the multi-path transmission mode or the multi-path transmission mode including the layer-3 relay indirect network communication path. If the RSD corresponding to the first data flow includes the third indication information (namely, the ProSe Layer-3 UE-to-Network Relay offload indication and the multi-path preference), the UE #1 determines to use, for transmission of the first data flow, the multi-path transmission mode or the multi-path transmission mode including the layer-3 relay indirect network communication path.

It may be understood that the URSP policy or the ProSe policy indicates to use multi-path transmission for the first data flow, in other words, it indicates that the terminal device needs to use multi-path transmission for the first data flow. Specifically, whether the indirect network communication path in the plurality of paths for transmission of the first data flow is the layer-2 relay indirect network communication path, the layer-3 relay indirect network communication path, or another indirect network communication path is not limited in this application.

It may be further understood that the URSP including the third indication information may also be referred to as an enhanced URSP or may have another name, the ProSe policy including the third indication information may also have another name, and the third indication information is merely an example. These are not limited in this application. The RSD may further include the ProSe Layer-3 UE-to-Network Relay offload indication, in other words, the UE #1 is allowed to connect to the network through the layer-3 relay terminal device. If the RSD includes the ProSe Layer-3 UE-to-Network Relay offload indication, the RSD may not include other information, where the other information is, for example, route selection descriptor precedence, a route selection component, session and service continuity mode selection (SSC mode selection), network slice selection, data network name (DNN) selection (DNN selection), PDU session type selection, or non-seamless offload indication. That is, the Pro Se Layer-3 UE-to-Network Relay offload indication is not used together with the foregoing other information.

If the UE #1 determines that a RSD corresponding to a data flow of which transmission is to be performed includes the ProSe Layer-3 UE-to-Network Relay offload indication, the UE #1 determines, based on the RSD, to use the layer-3 relay indirect network communication path to perform transmission of the data flow. The UE #1 serves as remote UE, discovers the layer-3 relay terminal device, establishes a PC5 connection to the layer-3 relay terminal device, and performs transmission of a data flow through the layer-3 relay terminal device.

The Multi-Path with Layer 3 UE-to-Network Relay indication and the ProSe Layer-3 UE-to-Network Relay offload indication can be used separately, in other words, do not need to cooperate with each other for usage. To be specific, if a RSD corresponding to a data flow includes the ProSe Layer-3 UE-to-Network Relay offload indication, the UE #1 determines to use the layer-3 relay indirect network communication path for transmission of the data flow; and if a RSD corresponding to a data flow includes the Multi-Path with Layer 3 UE-to-Network Relay indication, the UE #1 determines to use, for transmission of the data flow, the plurality of paths including the layer-3 relay indirect network communication path.

In some embodiments, the URSP policy or the ProSe policy further indicates a quantity of the plurality of paths for transmission of the first data flow.

For example, the URSP policy or the ProSe policy further indicates that the quantity of the plurality of paths for transmission of the first data flow is 3, and the terminal device may determine to perform transmission of the data flow through three paths. The three paths may be one direct network communication path and two layer-3 relay indirect network communication paths, or three layer-3 relay indirect network communication paths, or a combination of three other paths. This is not limited in this application.

In some embodiments, the URSP policy or the ProSe policy further indicates whether the plurality of paths for transmission of the first data flow include a direct network communication path. If the plurality of paths do not include the direct network communication path, the terminal device does not use the direct network communication path for transmission of the first data flow, or uses only an indirect network communication path for transmission of the first data flow. If the plurality of paths include the direct network communication path, the terminal device uses the direct network communication path for transmission of the first data flow, or uses the direct network communication path and an indirect network communication path for transmission of the first data flow.

In embodiments of this application, that the third indication information indicates to use multi-path transmission for the first data flow may be understood as follows: The third indication information indicates the terminal device for transmission of the first data flow through the plurality of paths. Whether the plurality of paths specifically include layer-3 relay indirect network communication paths is not limited in this application. After obtaining the third indication information, the terminal device may determine, based on the third indication information and a status of the terminal device, whether the plurality of paths for transmission of the first data flow include the layer-3 relay indirect network communication path.

It should be noted that, that the third indication information indicates the terminal device to use, to perform transmission, the multi-path transmission mode or the multi-path transmission mode including the layer-3 relay indirect network communication path may be understood as: The third indication information may not indicate a specific data flow (for example, the first data flow) for which the multi-path transmission mode or the multi-path transmission mode including the layer-3 relay indirect network communication path is to be used. Correspondingly, when the terminal device needs to perform transmission of a data flow, the terminal device may use, based on the third indication information and to perform transmission of the data flow, the multi-path transmission mode or the multi-path transmission mode including the layer-3 relay indirect network communication path.

Manner 3

If a single-path transmission mode is used for transmission of the first data flow, and a QoS parameter of the first data flow is not fulfilled, the terminal device determines to use the multi-path transmission mode for transmission of the first data flow.

The single-path transmission mode may be a transmission mode in which the terminal device performs transmission of the first data flow through a direct network communication path, or the single-path transmission mode may be a transmission mode in which the terminal device performs transmission of the first data flow through an indirect network communication path.

Possible Implementation #1

In some embodiments, before the terminal device determines to use the multi-path transmission mode for the first data flow, the method 700 further includes the following step.

The terminal device uses the single-path transmission mode for transmission of the first data flow, where the QoS parameter corresponding to the first data flow is not fulfilled, and the single-path transmission mode is a transmission mode in which the terminal device performs transmission of the first data flow through the direct network communication path.

For example, the direct network communication path corresponds to a PDU session. Before performing transmission of the first data flow, UE #1 establishes, based on a URSP policy, a PDU session that is for transmission of the first data flow. In the URSP policy, a RSD corresponding to the first data flow includes PDU session parameters such as a DNN and S-NSSAI, and the RSD does not include a ProSe Layer-3 UE-to-Network Relay offload indication.

In a process in which the UE #1 performs transmission of the first data flow through the PDU session, the UE #1 receives, from an SMF, a QoS parameter change notification, for example, indicating that the QoS parameter corresponding to the first data flow is not fulfilled, corresponding to the first data flow. Specifically, the SMF notifies the UE #1 that a rate, a latency, or reliability corresponding to the first data flow is not fulfilled. In this case, if the ProSe policy obtained by the UE #1 from the PCF indicates that the multi-path transmission mode including the layer-3 relay indirect network communication path may be used for transmission of the first data flow, the UE #1 may determine to use, for transmission of the first data flow, the multi-path transmission mode including the layer-3 relay indirect network communication path. For example, the multi-path transmission mode includes the layer-3 relay indirect network communication path and the direct network communication path that corresponds to the PDU session. The UE #1 serves as remote UE, and may perform a relay discovery procedure and a PC5 connection establishment procedure to establish the layer-3 relay indirect network communication path.

In some embodiments, the UE #1 determines a QoS parameter in the established layer-3 relay indirect network communication path based on a QoS parameter change.

Specifically, the UE #1 may use a reduced rate value or reliability value or an increased latency value, notified by the SMF, as a rate value, a latency value, or a reliability value of a QoS parameter in a PC5 connection.

For example, when the PDU session is used for transmission, a rate value included in a QoS profile corresponding to the first data flow is m1, a rate value corresponding to the first data flow in actual transmission is m2, and m2 is less than m1. In this case, the rate is not fulfilled. After determining m3 based on m2 and m1, and establishing the layer-3 relay indirect network communication path, the UE #1 may use m3 as a rate value included in a QoS profile in the PC5 connection, where m2 may be equal to m3, or m2 may not be equal to m3. This is not limited in this application.

For example, when the PDU session is used for transmission, a reliability value included in a QoS profile corresponding to the first data flow is p1, a reliability value corresponding to the first data flow in actual transmission is p2, and p2 is less than p1. In this case, the reliability is not fulfilled. After determining p3 based on p2 and p1, and establishing the layer-3 relay indirect network communication path, the UE #1 may use p3 as a reliability value included in a QoS profile in the PC5 connection, where p2 may be equal to p3, or p2 may not be equal to p3. This is not limited in this application.

For example, when the PDU session is used for transmission, a latency value included in a QoS profile corresponding to the first data flow is q1, a latency value corresponding to the first data flow in actual transmission is q2, and q2 is greater than q1. In this case, the latency is not fulfilled. After determining q3 based on q2 and q1, and establishing the layer-3 relay indirect network communication path, the UE #1 may use q3 as a latency value included in a QoS profile in the PC5 connection, where q2 may be equal to q3, or q2 may not be equal to q3. This is not limited in this application.

Possible Implementation #2

In some embodiments, before the terminal device determines to use the multi-path transmission mode for the first data flow, the method 700 further includes the following step.

The terminal device uses the single-path transmission mode for transmission of the first data flow, where the QoS parameter corresponding to the first data flow is not fulfilled, and the single-path transmission mode is a transmission mode in which the terminal device performs transmission of the first data flow through the indirect network communication path.

For example, the indirect network communication path is a layer-3 relay indirect network communication path. Before performing transmission of the first data flow, the UE #1 determines, based on a URSP policy, for transmission of the first data flow through the layer-3 relay indirect network communication path, and establishes the layer-3 relay indirect network communication path that is for transmission of the first data flow. In the URSP policy, a RSD corresponding to the first data flow includes a ProSe Layer-3 UE-to-Network Relay offload indication.

In a process in which the UE #1 performs transmission of the first data flow through the layer-3 relay indirect network communication path, the UE #2 is a layer-3 relay terminal device, and the UE #2 receives, from the SMF, a QoS parameter change notification corresponding to the first data flow, and notifies the UE #1 of the QoS parameter change notification. The QoS parameter change notification is, for example, that the QoS parameter corresponding to the first data flow is not fulfilled. Specifically, the SMF notifies the UE #2 that a rate, a latency, or reliability corresponding to the first data flow is not fulfilled. In this case, if the ProSe policy obtained by the UE #1 from the PCF indicates that the multi-path transmission mode including the layer-3 relay indirect network communication path may be used for the first data flow, the UE #1 may determine to use, for transmission of the first data flow, a multi-path transmission mode including the direct network communication path and the layer-3 relay indirect network communication path. For example, the multi-path transmission mode includes the layer-3 relay indirect network communication path and the direct network communication path that corresponds to the PDU session. The UE #1 establishes, based on another RSD (different from the RSD including the ProSe Layer-3 UE-to-Network Relay offload indication) in the URSP policy, a PDU session that is for transmission of the first data flow, or the UE #1 establishes, based on a correspondence between an RSC and a PDU session parameter, a PDU session that is for transmission of the first data flow. The RSC corresponds to the first data flow. Alternatively, the UE #1 may determine to use a plurality of layer-3 relay indirect network communication paths for transmission of the first data flow. For example, the UE #1 may determine to use a layer-3 relay indirect network communication path #1 (an existing path) and a layer-3 relay indirect network communication path #2 for transmission of the first data flow. The UE #1 serves as remote UE, and may perform a relay discovery procedure and a PC5 connection establishment procedure to establish the layer-3 relay indirect network communication path #2, and the layer-3 relay indirect network communication path #2 is an indirect network communication path that is of the UE #1 and that passes through a UE #3 (a layer-3 relay terminal device).

In some embodiments, the UE #2 uses a reduced rate value or reliability value or an increased latency value, notified by the SMF, as a rate value, a latency value, or reliability value of a QoS parameter in a PC5 connection (including a PC5 connection corresponding to the layer-3 relay indirect network communication path #1 and/or a PC5 connection corresponding to the layer-3 relay indirect network communication path #2).

This is similar to the case in which the UE #1 uses the reduced rate value or reliability value or the increased latency value, notified by the SMF, as the rate value, the latency value, or the reliability value of the QoS parameter in the PC5 connection. For specific content, refer to the foregoing related descriptions. Details are not described again.

In the solution provided in this implementation, when the terminal device discovers, in a process of transmission of the first data flow in the single-path transmission mode, that the QoS parameter corresponding to the first data flow is not fulfilled, the terminal device may trigger establishment of a plurality of paths including the layer-3 relay indirect network communication path, so that when the multi-path transmission mode is used for transmission of the first data flow, the QoS parameter corresponding to the first data flow can be fulfilled.

S720: The terminal device performs transmission of the first data flow through the at least two paths that are in the second path set.

The second path set may include a direct network communication path on which the terminal device accesses a network and an indirect network communication path on which the terminal device accesses the network through a relay terminal device.

In a possible implementation, the indirect network communication path includes a first indirect network communication path on which the terminal device accesses the network through a first relay terminal device.

For example, the first indirect network communication path includes: a layer-2 relay indirect network communication path and/or a layer-3 relay indirect network communication path.

For example, the first relay terminal device may be a layer-3 relay terminal device. This is not limited in this application.

In another possible implementation, the indirect network communication path further includes a second indirect network communication path on which the terminal device accesses the network through a second relay terminal device.

For example, the second relay terminal device may be a layer-3 relay terminal device. This is not limited in this application.

Specifically, the at least two paths that are in the second path set and that are for transmission of the first data flow include a third indirect network communication path, and the third indirect network communication path is a layer-3 relay indirect network communication path on which the terminal device accesses the network through a relay terminal device. For example, the at least two paths in the second path set include the third indirect network communication path and the direct network communication path, or the at least two paths in the second path set include the third indirect network communication path and do not include the direct network communication path. That the terminal device performs transmission of the first data flow through the direct network communication path means: The terminal device performs transmission of the first data flow through the PDU session. That the terminal device performs transmission of the first data flow through the third indirect network communication path means: The terminal device performs transmission of the first data flow through a PC5 connection between the terminal device and the relay terminal device and a PDU session of the relay terminal device.

It may be understood that the third indirect network communication path is an existing indirect network communication path, or the third indirect network communication path is a newly established indirect network communication path of the terminal device. The direct network communication path is an existing direct network communication path or a newly established direct network communication path. This is not limited in embodiments of this application.

Alternatively, the at least two paths in the second path set may further include another indirect network communication path, for example, the layer-2 relay indirect network communication path or the dual connectivity indirect network communication path mentioned in the method 300. For a method for establishing the layer-2 relay indirect network communication path or the dual connectivity indirect network communication path, refer to the foregoing related descriptions. Details are not described again.

That the terminal device accesses the network may be understood as: The terminal device accesses a network device. The direct network communication path on which the terminal device accesses the network may be understood as a direct network communication path between the terminal device and the network device (or a direct network communication path between the network device and the terminal device), and the indirect network communication path on which the terminal device accesses the network may be understood as an indirect network communication path that is between the terminal device and the network device and that passes through a relay terminal device (or an indirect network communication path that is between the network device and the terminal device and that passes through a relay terminal device).

For example, the network device may be an access network device or a UPF. When the network device is the access network device, the second path set includes a direct network communication path between the access network device and the terminal device and M indirect network communication paths that are between the access network device and the terminal device and that pass through M relay terminal devices. Alternatively, when the network device is the UPF, the second path set includes a direct network communication path between the UPF and the terminal device and M indirect network communication paths that are between the UPF and the terminal device and that pass through M relay terminal devices, where M is greater than or equal to 1.

For example, the M indirect network communication paths are indirect network communication paths that are between the access network device and the terminal device and that pass through layer (Layer) 3 relay terminal devices.

It may be understood that different indirect network communication paths may correspond to different access network devices. For example, an indirect network communication path 1 is a path that is between an access network device #1 and the terminal device and that passes through a layer-3 relay terminal device #1 (in other words, access network device #1→layer-3 relay terminal device #1→terminal device, or terminal device→layer-3 relay terminal device #1→access network device #1), an indirect network communication path 2 is a path that is between an access network device #2 and the terminal device and that passes through a layer-3 relay terminal device #2 (in other words, access network device #2→layer-3 relay terminal device #2→terminal device, or terminal device→layer-3 relay terminal device #2→access network device #2), and "→" represents a transmission direction.

It may be further understood that, when the network device is the access network device, the direct network communication path and the indirect network communication path that are in the second path set may also correspond to different access network devices. For example, the second path set includes the direct network communication path and the indirect network communication path 1, the direct network communication path is a path between an access network device #3 and the terminal device (namely, access network device #3→terminal device, or terminal device→access network device #3), and the indirect network communication path 1 is the path that is between the access network device #1 and the terminal device and that passes through the layer-3 relay terminal device #1.

For example, the M indirect network communication paths are indirect network communication paths that are between the UPF and the terminal device and that pass through layer-3 relay terminal devices.

It may be understood that different indirect network communication paths may correspond to different UPFs. For example, an indirect network communication path 3 is a path that is between a UPF #1 device and the terminal device and that passes through a layer-3 relay terminal device #1 (in other words, UPF #1→layer-3 relay terminal device #1→terminal device, or terminal device→layer-3 relay terminal device #1→UPF #1), and an indirect network communication path 4 is a path that is between a UPF #2 device and the terminal device and that passes through a layer-3 relay terminal device #2 (in other words, UPF #2→layer-3 relay terminal device #2→terminal device, or terminal device→layer-3 relay terminal device #2→UPF #2).

It may be further understood that when the network device is the UPF, the direct network communication path and the indirect network communication path that are in the second path set may also correspond to different UPFs. For example, the second path set includes the direct network communication path and the indirect network communication path 3, the direct network communication path is a path between a UPF #3 and the terminal device (namely, UPF #3—terminal device, or terminal device→UPF #3), and the indirect network communication path 3 is the path that is between the UPF #1 and the terminal device and that passes through the layer-3 relay terminal device #1.

It should be noted that, in embodiments of this application, device A—device B may be understood as that when transmission is performed between the device A and the device B, forwarding by another device is not performed, or may be understood as that when transmission is performed between the device A and the device B, forwarding may be performed by one or more another devices.

When the network device is the access network device, the direct network communication path represents a transmission path on which the terminal device is connected to the access network device and that does not pass through a relay terminal device, or represents a transmission path on which the terminal device is directly connected to the access network device. The indirect network communication path represents a transmission path on which the terminal device is connected to the access network device through a relay terminal device, or represents a transmission path on which the terminal device is not directly connected to the access network device.

When the network device is the UPF, the direct network communication path represents a transmission path on which the terminal device is connected to the UPF and that does not pass through a relay terminal device, or represents a transmission path on which the terminal device is directly connected to the UPF, or represents a transmission path of a PDU session of the terminal device. The indirect network communication path represents a transmission path on which the terminal device is connected to the UPF through a relay terminal device, or represents a transmission path on which the terminal device is not directly connected to the UPF, or represents a PC5 connection between the terminal device and a relay terminal device and a transmission path of a PDU session of the relay terminal device.

In the foregoing implementation, the terminal device can serve as a layer-3 remote terminal device, in other words, the terminal device supports layer-3 relay transmission. The terminal device can perform transmission of a data flow to the access network device or the UPF through a layer-3 relay terminal device only when the terminal device supports layer-3 relay transmission. The layer-3 relay terminal device is a relay terminal device that supports layer-3 relay transmission.

In some embodiments, the method 700 further includes the following step.

When there is no layer-3 relay indirect network communication path for transmission of the first data flow, the terminal device establishes a layer-3 relay indirect network communication path that is for transmission of the first data flow.

For example, the UE #1 determines the relay service code (RSC) corresponding to the first data flow, and the RSC is associated with a PC5 connection (where one PC5 connection is associated with one RSC, and the RSC is used as a context of the PC5 connection). If the RSC corresponding to the first data flow is an RSC #1, the UE #1 determines whether a PC5 connection is already associated with the RSC #1 or determines whether the context of the PC5 connection already includes the RSC #1. The RSC corresponding to the first data flow may be obtained from the PCF or locally preconfigured.

Case #1: The UE #1 determines that no PC5 connection is associated with the RSC #1, triggers a relay discovery procedure and a PC5 connection establishment procedure, and establishes, by using the RSC #1, a PC5 connection that is for transmission of the first data flow. After establishment of the PC5 connection is completed and establishment of the PDU session of the relay terminal device is completed, establishment of the layer-3 relay indirect network communication path is completed.

Case #2: The UE #1 determines that a PC5 connection (for example, a PC5 connection #1) has been associated with the RSC #1. In this case, a PC5 connection modification procedure may be performed, in other words, the PC5 connection #1 is modified for transmission of the first data flow.

For example, the UE #1 determines, based on the RSC corresponding to the first data flow and a PDU session parameter (for example, a DNN or S-NSSAI) associated with the RSC, whether there already is a PDU session for transmission of the first data flow. The PDU session parameter associated with the RSC may be preconfigured, or may be obtained by the UE #1 from the PCF.

Case #1: The UE #1 determines that there is no PDU session that can be for transmission of the first data flow (for example, a parameter of an established PDU session is different from the DNN and the S-NSSAI that are associated with the RSC corresponding to the first data flow), and establishes a PDU session that is for transmission of the first data flow.

Case #2: The UE #1 determines that there already is a PDU session (for example, a PDU session #1) that can be for transmission of the first data flow (for example, a parameter of the established PDU session is the same as the DNN and the S-NSSAI that are associated with the RSC corresponding to the first data flow). In this case, a PDU session modification procedure may be performed, in other words, the PDU session #1 is modified for transmission of the first data flow.

In some embodiments, the method 700 further includes the following step.

When there is no direct network communication path for transmission of the first data flow, the terminal device establishes the direct network communication path that is for transmission of the first data flow.

In a possible implementation, when there is no PDU session that is for transmission of the first data flow, the terminal device establishes a PDU session that is for transmission of the first data flow.

For example, the UE #1 determines, based on a DNN/single network slice selection assistance information (S-NSSAI) included in the RSD corresponding to the first data flow, whether there already is a PDU session that is for transmission of the first data flow.

Case #1: The UE #1 determines that there is no PDU session that can be for transmission of the first data flow (for example, a parameter of an established PDU session is different from the DNN and the S-NSSAI that are included in the RSD corresponding to the first data flow), and establishes the PDU session that is for transmission of the first data flow.

Case #2: The UE #1 determines that there already is a PDU session (for example, a PDU session #1) that can be for transmission of the first data flow (for example, a parameter of the established PDU session is the same as the DNN and the S-NSSAI that are included in the RSD corresponding to the first data flow). In this case, a PDU session modification procedure may be performed, in other words, the PDU session #1 is modified for transmission of the first data flow.

Based on the method 700, the terminal device may determine, independently or according to a network configuration policy, to perform transmission of the first data flow through the at least two paths, so that when communication quality of one of the at least two paths is poor, reliability or a rate of data transmission can be improved.

It should be noted that, in embodiments of this application, unless otherwise specified, a plurality of indicates two or more.

It should be understood that the steps shown in the dashed lines in the foregoing flowchart are optional steps, and a sequence of the steps is determined based on internal logic of the methods. Sequence numbers shown in the figure are merely examples, and do not limit a sequence of the steps in this application.

It should be further understood that the methods provided in embodiments of this application may be used independently or in combination. This is not limited in this application.

It should be noted that the execution body shown in FIG. 4 to FIG. 9 is merely an example, and the execution body may also be a chip, a chip system, or a processor that supports the execution body in implementing the methods shown in FIG. 4 to FIG. 9. This is not limited in this application.

The foregoing describes the method embodiments in embodiments of this application with reference to the accompanying drawings, and the following describes apparatus embodiments in embodiments of this application. It can be understood that the descriptions of the method embodiments and the descriptions of the apparatus embodiments may correspond to each other. Therefore, for a part that is not described, refer to the foregoing method embodiments.

It may be understood that, in the foregoing method embodiments, methods and operations implemented by a core network element may also be implemented by a component (for example, a chip or a circuit) that may be used in the core network element. Methods and operations implemented by an access network device may also be implemented by a component (for example, a chip or a circuit) that may be used in the access network device. Methods and operations implemented by a terminal device may also be implemented by a component (for example, a chip or a circuit) that may be used in the terminal device.

The foregoing mainly describes the solutions provided in embodiments of this application from a perspective of interaction between network elements. It may be understood that, to implement the foregoing functions, each network element such as a transmitting end device or a receiving end device includes a corresponding hardware structure and/or software module for performing each function. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional module division may be performed on the transmitting end device or the receiving end device based on the foregoing method examples. For example, each functional module may be obtained through division corresponding to each function, or two or more functions may be integrated in one processing module. The integrated module may be implemented in a form of hardware, or may be implemented in a form of a software functional module. It should be noted that, in embodiments of this application, module division is an example, and is merely a logical function division. In actual implementation, another division manner may be used. An example in which each functional module is obtained through division based on each corresponding function is used below for description.

FIG. 10 is a schematic block diagram of a communication apparatus according to an embodiment of this application. The communication apparatus 800 includes a transceiver unit 810 and a processing unit 820. The transceiver unit 810 may communicate with the outside, and the processing unit 820 is configured to process data. The transceiver unit 810 may also be referred to as a communication interface or a communication unit.

In some embodiments, the communication apparatus 800 may further include a storage unit. The storage unit may be configured to store instructions and/or data, and the processing unit 820 may read the instructions and/or the data in the storage unit.

In a design, the communication apparatus 800 may be an access network device, the transceiver unit 810 is configured to perform a receiving or sending operation of the access network device in the foregoing method embodiments, and the processing unit 820 is configured to perform an internal processing operation of the access network device in the foregoing method embodiments.

In a possible implementation, the processing unit 820 is configured to determine a plurality of paths that are for transmission of a first quality of service QoS flow of a terminal device, where the plurality of paths include at least two paths that are in a first path set, the first path set includes N indirect paths, and a direct path between the access network device and the terminal device, the N indirect paths include indirect paths that are between the access network device and the terminal device and that pass through N relay terminal devices, and N is an integer greater than or equal to 1. The transceiver unit 810 is configured to perform transmission of the first QoS flow through the plurality of paths.

In a possible implementation, the transceiver unit 810 is further configured to receive first indication information from a core network element, where the first indication information indicates to use a multi-path transmission mode for the first QoS flow. The processing unit 820 is further configured to determine, based on the first indication information, the plurality of paths that are for transmission of the first QoS flow of the terminal device.

In a possible implementation, the first indication information further includes a specific form of the multi-path transmission mode, namely, duplication transmission or split transmission.

In a possible implementation, before determining the plurality of paths that are for transmission of the first QoS flow of the terminal device, the processing unit 820 is further configured to determine to use the multi-path transmission mode for the first QoS flow.

In a possible implementation, the multi-path transmission mode includes a multi-path transmission mode that is performed through a relay terminal device.

In a possible implementation, the processing unit 820 is further configured to determine, based on authorization information, to use the multi-path transmission mode for the first QoS flow, where the authorization information indicates that the terminal device is authorized to serve as a remote terminal device or is authorized to use the multi-path transmission mode.

In a possible implementation, the transceiver unit 810 is further configured to receive request information from the terminal device, where the request information requests to use the multi-path transmission mode for transmission of the first QoS flow. The processing unit 820 is further configured to determine, based on the request information, to use the multi-path transmission mode for the first QoS flow. Alternatively, the processing unit 820 is further configured to determine, based on the request information and authorization information, to use the multi-path transmission mode for the first QoS flow, where the authorization information indicates that the terminal device is authorized to serve as a remote terminal device or is authorized to use the multi-path transmission mode.

In a possible implementation, when a QoS parameter of the first QoS flow is not fulfilled, the processing unit 820 determines to use the multi-path transmission mode for the first QoS flow.

In a possible implementation, when the QoS parameter of the first QoS flow of which transmission is performed through the plurality of paths is not fulfilled, the transceiver unit 810 is further configured to send first information to the core network element, where the first information indicates that the QoS parameter of the first QoS flow is not fulfilled, or the first information indicates that the QoS parameter of the first QoS flow is not fulfilled when the multi-path transmission mode is used for the first QoS flow.

In a possible implementation, the transceiver unit 810 is further configured to send second information to the terminal device, where the second information is for triggering the terminal device to report information about a relay terminal device. The transceiver unit 810 is further configured to receive information about at least one relay terminal device from the terminal device. The processing unit 820 is further configured to establish, based on the information about the at least one relay terminal device, the indirect path that is in the plurality of paths.

In a possible implementation, the processing unit 820 is further configured to send third information to the at least one relay terminal device, where the third information is for triggering the at least one relay terminal device to participate in relay discovery.

In a possible implementation, the processing unit 820 is further configured to establish a dedicated data radio bearer for the first QoS flow, and the transceiver unit 810 is configured to perform transmission of the first QoS flow to the terminal device on the data radio bearer through the plurality of paths.

In a possible implementation, the transceiver unit 810 is further configured to receive max path number information corresponding to the multi-path transmission mode, and the processing unit 820 is further configured to determine a quantity of the plurality of paths based on the max path number information.

Alternatively, the communication apparatus 800 may be a component configured in the access network device, for example, a chip in the access network device.

In another design, the communication apparatus 800 may be the core network element, for example, an SMF. The transceiver unit 810 is configured to perform a receiving or sending operation of the core network element in the foregoing method embodiments. The processing unit 820 is configured to perform an internal processing operation of the core network element in the foregoing method embodiments.

In a possible implementation, the processing unit 820 is configured to determine to use a multi-path transmission mode for a first quality of service QoS flow of a terminal device, where the multi-path transmission mode is a transmission mode including at least two paths that are in a first path set, the first path set includes N indirect paths, and a direct path between an access network device and the terminal device, the N indirect paths include indirect paths that are between the access network device and the terminal device and that pass through N relay terminal devices, and N is an integer greater than or equal to 1. The transceiver unit 810 is configured to send first indication information, where the first indication information indicates to use the multi-path transmission mode for the first QoS flow.

In a possible implementation, the first indication information further includes a specific form of the multi-path transmission mode, namely, duplication transmission or split transmission.

In a possible implementation, the processing unit 820 is further configured to determine, based on authorization information, to use the multi-path transmission mode for the first QoS flow, where the authorization information indicates that the terminal device is authorized to serve as a remote terminal device or is authorized to use the multi-path transmission mode.

In a possible implementation, the transceiver unit 810 is further configured to send second indication information to the terminal device, where the second indication information indicates to use the multi-path transmission mode for a first data flow, and the first data flow includes a first service flow or the first QoS flow.

In a possible implementation, the transceiver unit 810 is further configured to receive request information from the terminal device, where the request information requests to use the multi-path transmission mode for the first QoS flow. The processing unit 820 is further configured to determine, based on the request information, to use the multi-path transmission mode for the first QoS flow.

In a possible implementation, the transceiver unit 810 is further configured to receive request information from the terminal device, where the request information requests to use the multi-path transmission mode for the first service flow. The processing unit 820 is further configured to allocate the first QoS flow to the first service flow, and the processing unit 820 is further configured to determine, based on the request information, to use the multi-path transmission mode for the first QoS flow.

In a possible implementation, the transceiver unit 810 is further configured to receive fourth information from the access network device, where the fourth information indicates that a QoS parameter of the first QoS flow is not fulfilled, and the processing unit 820 is further configured to determine, based on the fourth information, to use the multi-path transmission mode for the first QoS flow of the terminal device.

In a possible implementation, the transceiver unit 810 is further configured to send max path number information to the access network device, where the max path number information is for determining a quantity of a plurality of paths that are for transmission of the first QoS flow.

Alternatively, the communication apparatus 800 may be a component configured in the core network element, for example, a chip in the core network element.

In this case, the transceiver unit 810 may be an interface circuit, a pin, or the like. Specifically, the interface circuit may include an input circuit and an output circuit, and the processing unit 820 may include a processing circuit.

In some embodiments, the transceiver unit 810 may alternatively be a radio frequency module. The processing unit 820 may be a baseband module. The radio frequency module is mainly configured to send and receive a radio frequency signal and convert the radio frequency signal and a baseband signal. The baseband module is mainly configured to perform baseband processing, control a base station, and the like.

Figure 11:
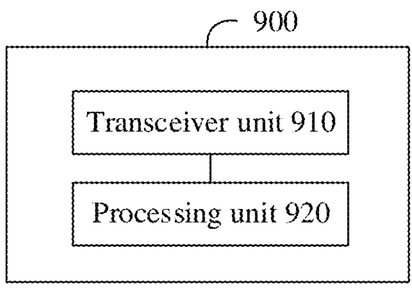
FIG. 11 is a schematic block diagram of another communication apparatus according to an embodiment of this application.

FIG. 11 is a schematic block diagram of a communication apparatus according to an embodiment of this application. The communication apparatus 900 includes a transceiver unit 910 and a processing unit 920. The transceiver unit 910 may communicate with the outside, and the processing unit 920 is configured to process data. The transceiver unit 910 may also be referred to as a communication interface or a communication unit.

In some embodiments, the communication apparatus 900 may further include a storage unit. The storage unit may be configured to store instructions and/or data, and the processing unit 920 may read the instructions and/or the data in the storage unit.

In a case, the communication apparatus 900 may be a terminal device, the transceiver unit 910 is configured to perform a receiving or sending operation of the terminal device in the foregoing method embodiments, and the processing unit 920 is configured to perform an internal processing operation of the terminal device in the foregoing method embodiments.

In a possible implementation, the processing unit 920 is configured to determine to use a multi-path transmission mode for a first data flow, where the first data flow includes a first service flow or a first quality of service QoS flow, the multi-path transmission mode is a transmission mode including at least two paths that are in a first path set, the first path set includes N indirect paths, and a direct path between an access network device and the terminal device, the N indirect paths include indirect paths that are between the access network device and the terminal device and that pass through N relay terminal devices, and N is an integer greater than or equal to 1. The transceiver unit 910 is configured to send request information, where the request information requests to use the multi-path transmission mode for the first data flow.

In a possible implementation, the transceiver unit 910 is further configured to receive second indication information from a core network element, where the second indication information indicates to use the multi-path transmission mode for the first data flow, and the processing unit 920 is further configured to determine, based on the second indication information, to use the multi-path transmission mode for the first data flow.

In a possible implementation, the transceiver unit 910 is further configured to receive fourth information, where the fourth information indicates that a QoS parameter of the first QoS flow is not fulfilled. The processing unit 920 is further configured to determine, based on the fourth information, to use the multi-path transmission mode for the first QoS flow. Alternatively, the processing unit 920 is further configured to determine, based on the fourth information and authorization information, to use the multi-path transmission mode for the first QoS flow, where the authorization information indicates that the terminal device is authorized to serve as a remote terminal device or is authorized to use the multi-path transmission mode.

In a possible implementation, the transceiver unit 910 is further configured to receive second information from the access network device, where the second information is for triggering the terminal device to report information about a relay terminal device; and the transceiver unit 910 is further configured to send information about at least one relay terminal device to the access network device, where the information about the at least one relay terminal device is for establishing the indirect path that is in the multi-path transmission mode.

In another design, the processing unit 920 is configured to determine to use a multi-path transmission mode for transmission of a first data flow, where the multi-path transmission mode is a mode of transmission through at least two paths. The transceiver unit 910 is configured to perform transmission of the first data flow through at least two paths that are in a second path set, where the second path set includes a direct network communication path on which the terminal device accesses a network and an indirect network communication path on which the terminal device accesses the network through a relay terminal device.

In a possible implementation, the indirect network communication path includes a first indirect network communication path on which the terminal device accesses the network through a first relay terminal device.

In a possible implementation, the first indirect network communication path includes: a layer-2 relay indirect network communication path and/or a layer-3 relay indirect network communication path.

In a possible implementation, the indirect network communication path further includes a second indirect network communication path on which the terminal device accesses the network through a second relay terminal device.

In a possible implementation, the first relay terminal device is a layer-3 relay terminal device.

In a possible implementation, the processing unit 920 is specifically configured to: determine, based on a route selection policy of the terminal device or based on a proximity-based service policy of the terminal device, to use the multi-path transmission mode for transmission of the first data flow. Alternatively, if a single-path transmission mode is used for transmission of the first data flow, and a QoS parameter of the first data flow is not fulfilled, the processing unit 920 is configured to determine to use the multi-path transmission mode for transmission of the first data flow. The single-path transmission mode is a transmission mode in which the terminal device performs transmission of the first data flow through a protocol data unit PDU session, or the single-path transmission mode is a transmission mode in which the terminal device performs transmission of the first data flow through a layer-3 relay terminal device.

In a possible implementation, the transceiver unit 910 is further configured to receive the route selection policy of the terminal device or the proximity-based service policy of the terminal device.

In a possible implementation, the processing unit 920 is specifically configured to determine to use, for transmission of the first data flow, a multi-path transmission mode including the layer-3 relay indirect network communication path, where the multi-path transmission mode including the layer-3 relay indirect path is a mode of transmission through at least two paths, and the at least two paths include the layer-3 relay indirect network communication path.

In a possible implementation, the transceiver unit 910 is further configured to receive third indication information, where the third indication information indicates to use the multi-path transmission mode for the first data flow, and the at least two paths in the multi-path transmission mode include a layer-3 relay indirect network communication path, or the third indication information indicates to use, for the first data flow, the multi-path transmission mode including a layer-3 relay indirect network communication path, the multi-path transmission mode including the layer-3 relay indirect network communication path is a mode of transmission through at least two paths, and the at least two paths include the layer-3 relay indirect network communication path.

In a possible implementation, the at least two paths in the second path set include a third indirect network communication path, and the third indirect network communication path is the layer-3 relay indirect network communication path on which the terminal device accesses the network through the first relay terminal device.

In a possible implementation, the transceiver unit 910 is further configured to receive the route selection policy of the terminal device or the proximity-based service policy of the terminal device, where the route selection policy of the terminal device or the proximity-based service policy of the terminal device includes the third indication information.

In a possible implementation, the processing unit 920 is further configured to: when there is no indirect network communication path for transmission of the first data flow, establish an indirect network communication path that is for transmission of the first data flow; or the processing unit 920 is further configured to: when there is no direct network communication path for transmission of the first data flow, establish a direct network communication path that is for transmission of the first data flow.

It may be understood that the communication apparatus 900 may alternatively be a component configured in the terminal device, for example, a chip in the terminal device.

In this case, the transceiver unit 910 may be an interface circuit, a pin, or the like. Specifically, the interface circuit may include an input circuit and an output circuit, and the processing unit 920 may include a processing circuit.

Figure 12:
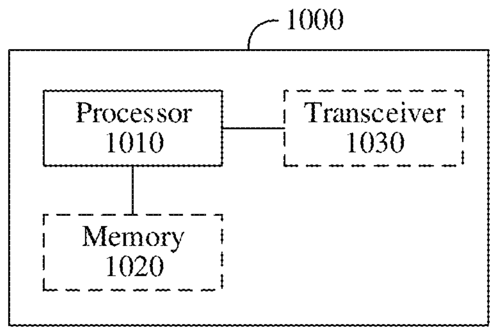
FIG. 12 is a schematic diagram of a structure of a communication apparatus according to an embodiment of this application.

As shown in FIG. 12, an embodiment of this application further provides a communication apparatus 1000. The communication apparatus 1000 includes a processor 1010. The processor 1010 is coupled to a memory 1020. The memory 1020 is configured to store a computer program or instructions and/or data. The processor 1010 is configured to execute the computer program or the instructions and/or the data stored in the memory 1020, so that the methods in the foregoing method embodiments are executed.

In some embodiments, the communication apparatus 1000 includes one or more processors 1010.

In some embodiments, as shown in FIG. 12, the communication apparatus 1000 may further include the memory 1020.

In some embodiments, the communication apparatus 1000 may include one or more memories 1020.

In some embodiments, the memory 1020 and the processor 1010 may be integrated or separately disposed.

In some embodiments, as shown in FIG. 12, the communication apparatus 1000 may further include a transceiver 1030 and/or a communication interface. The transceiver 1030 and/or the communication interface are/is configured to receive and/or send a signal. For example, the processor 1010 is configured to control the transceiver 1030 to receive and/or send a signal.

It should be understood that the communication interface is used for communication between core network elements. For example, the communication interface is used for communication between a core network element and an access network device or another core network element.

In a solution, the communication apparatus 1000 is configured to implement the operations performed by the core network element in the foregoing method embodiments.

For example, the processor 1010 is configured to implement an operation performed inside the core network element in the foregoing method embodiments, and the transceiver 1030 is configured to implement a receiving or sending operation performed by the core network element in the foregoing method embodiments. The processing unit 820 in the apparatus 800 may be the processor in FIG. 12, and the transceiver unit 810 may be the transceiver and/or the communication interface in FIG. 12. For specific operations performed by the processor 1010, refer to the foregoing descriptions of the processing unit 820. For operations performed by the transceiver 1030, refer to the descriptions of the transceiver unit 810. Details are not described herein again.

In another solution, the communication apparatus 1000 is configured to implement the operations performed by the access network device in the foregoing method embodiments.

For example, the processor 1010 is configured to implement an operation performed inside the access network device in the foregoing method embodiments, and the transceiver 1030 is configured to implement a receiving or sending operation performed by the access network device in the foregoing method embodiments. The processing unit 820 in the apparatus 800 may be the processor in FIG. 12, and the transceiver unit 810 may be the transceiver and/or the communication interface in FIG. 12. For specific operations performed by the processor 1010, refer to the foregoing descriptions of the processing unit 820. For operations performed by the transceiver 1030, refer to the descriptions of the transceiver unit 810. Details are not described herein again.

Figure 13:
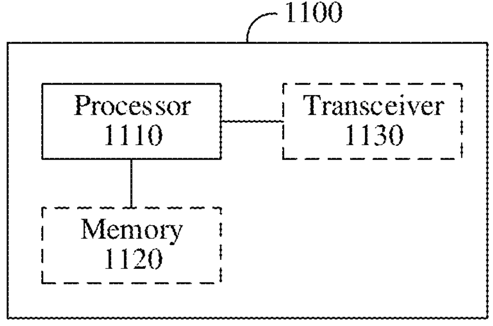
FIG. 13 is a schematic diagram of a structure of another communication apparatus according to an embodiment of this application.

As shown in FIG. 13, an embodiment of this application further provides a communication apparatus 1100. The communication apparatus 1100 includes a processor 1110. The processor 1110 is coupled to a memory 1120. The memory 1120 is configured to store a computer program or instructions and/or data. The processor 1110 is configured to execute the computer program or the instructions and/or the data stored in the memory 1120, so that the methods in the foregoing method embodiments are executed.

In some embodiments, the communication apparatus 1100 includes one or more processors 1110.

In some embodiments, as shown in FIG. 13, the communication apparatus 1100 may further include the memory 1120.

In some embodiments, the communication apparatus 1100 may include one or more memories 1120.

In some embodiments, the memory 1120 and the processor 1110 may be integrated or separately disposed.

In some embodiments, as shown in FIG. 13, the communication apparatus 1100 may further include a transceiver 1130 and/or a communication interface. The transceiver 1130 and/or the communication interface are/is configured to receive and/or send a signal. For example, the processor 1110 is configured to control the transceiver 1130 and/or the communication interface to receive and/or send a signal.

In a solution, the communication apparatus 1100 is configured to implement the operations performed by the terminal device in the foregoing method embodiments. For example, the processor 1110 is configured to implement an operation performed inside the terminal device in the foregoing method embodiments, and the transceiver 1130 is configured to implement a receiving or sending operation performed by the terminal device in the foregoing method embodiments. The processing unit 920 in the apparatus 900 may be the processor in FIG. 13, and the transceiver unit 910 may be the transceiver in FIG. 13. For specific operations performed by the processor 1110, refer to the foregoing descriptions of the processing unit 920. For operations performed by the transceiver 1130, refer to the descriptions of the transceiver unit 910. Details are not described herein again.

An embodiment of this application further provides a computer-readable storage medium. The computer-readable storage medium stores computer instructions used to implement the method performed by a core network element, the method performed by an access network device, or the method performed by a terminal device in the foregoing method embodiments.

For example, when a computer program is executed by a computer, the computer is enabled to implement the method performed by the core network element, the method performed by the access network device, or the method performed by the terminal device in the foregoing method embodiments.

An embodiment of this application further provides a computer program product including instructions. When the instructions are executed by a computer, the computer is enabled to implement the method performed by the core network element, the method performed by the access network device, or the method performed by the terminal device in the foregoing method embodiments.

An embodiment of this application further provides a communication system. The communication system includes the core network element, the access network device, and the terminal device in the foregoing embodiments. In some embodiments, the communication system further includes the relay terminal device in the foregoing embodiments.

An embodiment of this application further provides a communication system. The communication system includes the terminal device in the foregoing embodiments.

Further, the communication system may further include an access network device or a core network element (for example, a UPF).

For explanations and beneficial effects of related content of any of the communication apparatuses provided above, refer to the corresponding method embodiment provided above. Details are not described herein again.

In this embodiment of this application, the core network element, the access network device, or the terminal device may include a hardware layer, an operating system layer running above the hardware layer, and an application layer running above the operating system layer. The hardware layer may include hardware such as a central processing unit (CPU), a memory management unit (MMU), and a memory (also referred to as main storage). An operating system at the operating system layer may be any one or more computer operating systems that implement service processing through a process, for example, a Linux operating system, a Unix operating system, an Android operating system, an iOS operating system, or a Windows operating system. The application layer may include applications such as a browser, an address book, word processing software, and instant communication software.

A specific structure of an execution body of the method provided in embodiments of this application is not specifically limited in embodiments of this application, provided that a program that records code of the methods provided in embodiments of this application can be run to perform communication according to the methods provided in embodiments of this application. For example, the methods provided in embodiments of this application may be executed by a core network element, an access network device, or a terminal device, or a functional module that is in the core network element, the access network device, or the terminal device and that can invoke and execute a program.

Terminologies such as "component", "module", and "system" used in this specification indicate computer-related entities, hardware, firmware, combinations of hardware and software, software, or software being executed. For example, the component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and the component may be located on one computer and/or distributed between two or more computers. In addition, these components may be executed from various computer-readable media that store various data structures. For example, the components may communicate by using a local and/or remote process and based on, for example, a signal having one or more packets (for example, data from two components interacting with another component in a local system, a distributed system, and/or across a network such as the Internet interacting with other systems by using the signal).

It should be further understood that "first", "second", and various numbers in this specification are merely used for differentiation for ease of description, and are not construed as a limitation to the scope of embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, with reference to the examples described in embodiments disclosed in this specification, units and steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatuses, and methods may be implemented in other manners. For example, the apparatus embodiments described above are merely examples. For example, the unit division is merely logical function division. The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions in embodiments.

When the functions are implemented in the form of a software functional unit and sold or used as an independent product, the functions may be stored in a computer-readable storage medium. Based on such an understanding, the technical solutions of this application essentially, or the part contributing to the technology of some approaches, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The computer-readable storage medium may be any usable medium accessible to a computer. For example, the computer-readable medium may include but is not limited to a random access memory (RAM), a read-only memory (ROM), a programmable read-only memory (programmable ROM, PROM), an erasable programmable read-only memory (erasable PROM, EPROM), an electrically erasable programmable read-only memory (EEPROM), a compact disc read-only memory (CD-ROM), a universal serial bus flash disk (universal serial bus flash disk), a removable hard disk, another optical disk storage, a magnetic disk storage medium or another magnetic storage device, or any other medium that can carry or store expected program code in a form of an instruction or a data structure and that can be accessed by a computer. In addition, by way of example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), or a direct rambus random access memory (direct rambus RAM, DR RAM).

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A data transmission method, comprising:

determining, by a terminal device, to use a multi-path transmission mode for transmission of a first data flow, wherein the multi-path transmission mode is through at least two paths; and performing, by the terminal device, transmission of the first data flow through at least two paths of a second path set, wherein the second path set comprises a direct network communication path on which the terminal device is configured to access a network and an indirect network communication path on which the terminal device is configured to access the network through a relay terminal device.

2. The method according to claim 1, wherein the indirect network communication path comprises a first indirect network communication path on which the terminal device is configured to access the network through the relay terminal device.

3. The method according to claim 2, wherein the first indirect network communication path comprises a layer-3 relay indirect network communication path.

4. The method according to claim 2, wherein the relay terminal device is a layer-3 relay terminal device.

5. The method according to claim 1, wherein the determining, by the terminal device, to use the multi-path transmission mode for transmission of the first data flow comprises:

receiving, by the terminal device, first indication information, wherein the first indication information is useable to indicate to use, for the first data flow, the multi-path transmission mode, the multi-path transmission mode comprising a layer-3 relay indirect network communication path, and the at least two paths comprise the layer-3 relay indirect network communication path.

6. The method according to claim 5, wherein the first indication information is included in a route selection policy of the terminal device.

7. The method according to claim 1, wherein the determining, by the terminal device, to use the multi-path transmission mode for transmission of the first data flow comprises:

receiving, by the terminal device, first indication information, wherein the first indication information comprises a multi-path preference.

8. The method according to claim 1, wherein the method further comprises:

establishing, by the terminal device, the indirect network communication path that is useable for transmission of the first data flow in response to there being no indirect network communication path for transmission of the first data flow.

9. The method according to claim 1, wherein the method further comprises:

establishing, by the terminal device, the direct network communication path that is useable for transmission of the first data flow in response to there being no direct network communication path for transmission of the first data flow.

10. A communication apparatus, comprising at least one processor and a memory, wherein the memory is configured to store non-transitory instructions, and in response to the non-transitory instructions being executed by the at least one processor causes the communication apparatus to perform:

determining to use a multi-path transmission mode for a terminal device to transmit a first data flow, wherein the multi-path transmission mode is through at least two paths; and performing transmission of the first data flow through at least two paths of a second path set, wherein the second path set comprises a direct network communication path on which the terminal device is configured to access a network and an indirect network communication path on which the terminal device is configured to access the network through a relay terminal device.

11. The communication apparatus according to claim 10, wherein the non-transitory instructions being executed by the at least one processor further causes the communication apparatus to perform:

receive first indication information, wherein the first indication information is useable to indicate to use, for the first data flow, the multi-path transmission mode, the multi-path mode comprising a layer-3 relay indirect network communication path, and the at least two paths comprise the layer-3 relay indirect network communication path.

12. The communication apparatus according to claim 11, wherein the first indication information is included in a route selection policy of the terminal device.

13. The communication apparatus according to claim 10, wherein the non-transitory instructions being executed by the at least one processor further causes the communication apparatus to perform:

receive first indication information, wherein the first indication information comprises a multi-path preference.

14. The communication apparatus according to claim 10, wherein the indirect network communication path comprises a first indirect network communication path on which the terminal device configured to access the network through the relay terminal device.

15. The communication apparatus according to claim 14, wherein the first indirect network communication path comprises a layer-3 relay indirect network communication path.

16. A non-transitory computer readable storage medium, wherein the computer readable storage medium is configured to store non-transitory instructions, and in response to the non-transitory instructions being executed by a processor causes the processor to perform operations:

determining to use a multi-path transmission mode for a terminal device to transmit a first data flow, wherein the multi-path transmission mode is through at least two paths; and performing transmission of the first data flow through at least two paths that are in a second path set, wherein the second path set comprises a direct network communication path on which the terminal device is configured to access a network and an indirect network communication path on which the terminal device is configured to access the network through a relay terminal device.

17. The non-transitory computer readable storage medium according to claim 16, wherein the operations further comprise:

receiving first indication information, wherein the first indication information is useable to indicate to use, for the first data flow, the multi-path transmission mode, the multi-path transmission mode comprising a layer-3 relay indirect network communication path, and the at least two paths comprise the layer-3 relay indirect network communication path.

18. The non-transitory computer readable storage medium according to claim 17, wherein the first indication information is included in a route selection policy of the terminal device.

19. The non-transitory computer readable storage medium according to claim 16, wherein the operations further comprise:

receiving first indication information, wherein the first indication information comprises a multi-path preference.

20. The non-transitory computer readable storage medium according to claim 16, wherein the indirect network communication path comprises a first indirect network communication path on which the terminal device is configured to access the network through the relay terminal device.

* * * * *